US009251288B2

(12) United States Patent
Uno et al.

(10) Patent No.: US 9,251,288 B2
(45) Date of Patent: Feb. 2, 2016

(54) THUMBNAIL DISTRIBUTION SYSTEM, SERVER, CLIENT AND PROGRAM

(75) Inventors: Fumitoshi Uno, Okazaki (JP); Tomoki Nakamura, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 978 days.

(21) Appl. No.: 12/245,307

(22) Filed: Oct. 3, 2008

(65) Prior Publication Data
US 2009/0094322 A1 Apr. 9, 2009

(30) Foreign Application Priority Data

Oct. 9, 2007 (JP) ................. 2007-263363

(51) Int. Cl.
*G06F 15/16* (2006.01)
*G06F 17/30* (2006.01)
*H04N 1/32* (2006.01)

(52) U.S. Cl.
CPC .... *G06F 17/30905* (2013.01); *G06F 17/30244* (2013.01); *H04N 1/32101* (2013.01); *H04N 2201/325* (2013.01)

(58) Field of Classification Search
CPC ............. H04N 1/32101; H04N 2201/325; G06F 17/30905; G06F 17/30244
USPC .................. 709/217, 222, 227, 237
See application file for complete search history.

(56) References Cited

U.S. PATENT DOCUMENTS 5,600,641 A * 2/1997 Duault et al. ................. 370/400
6,049,821 A * 4/2000 Theriault et al. ............. 709/203
6,154,723 A * 11/2000 Cox et al. ...................... 704/270

(Continued)

FOREIGN PATENT DOCUMENTS

JP 7-200201 8/1995
JP 2002-117005 4/2002

(Continued)

OTHER PUBLICATIONS

Unknown Author; WebDAV; Internet Archive copy from Jul. 16, 2007; Internet.com; Webopedia; 2 Pages.*

(Continued)

*Primary Examiner* — Krista Zele
*Assistant Examiner* — Anthony Fabbri
(74) *Attorney, Agent, or Firm* — Scully, Scott, Murphy & Presser, P.C.

(57) ABSTRACT

A thumbnail distribution system includes a client device and a server communicatable with each other by using a hyper text transfer protocol (HTTP). A client device includes a request generating unit, a request transmitting unit, a response receiving unit, and a data processing unit. The request generating unit generates an HTTP request having a request line storing a file name of a file store in a storing unit. The request transmitting unit transmits the HTTP request. The response receiving unit receives an HTTP response having a response body storing a thumbnail corresponding to the file having the file name stored in the request line. The data processing unit performs a data processing based on the thumbnail stored in the response body. The request receiving unit receives the HTTP request transmitted from the request transmitting unit. The response generating unit generates the HTTP response based on the HTTP request. The response transmitting unit transmits the HTTP response to the response receiving unit.

22 Claims, 13 Drawing Sheets

(56) References Cited

U.S. PATENT DOCUMENTS

| | | | |
|---|---|---|---|
| 6,154,768 A * | 11/2000 | Chen et al. | 709/203 |
| 6,345,279 B1 * | 2/2002 | Li et al. | 1/1 |
| 6,606,655 B1 * | 8/2003 | Yap et al. | 709/219 |
| 6,654,023 B1 * | 11/2003 | Peterson | 345/587 |
| 7,263,710 B1 * | 8/2007 | Hummel et al. | 725/86 |
| 7,511,842 B2 * | 3/2009 | Mihira | 358/1.15 |
| 7,581,006 B1 * | 8/2009 | Lara et al. | 709/226 |
| 7,640,347 B1 * | 12/2009 | Sloat et al. | 709/228 |
| 2002/0059458 A1 * | 5/2002 | Deshpande et al. | 709/246 |
| 2002/0122073 A1 * | 9/2002 | Abrams et al. | 345/838 |
| 2002/0156923 A1 * | 10/2002 | Tanimoto | 709/246 |
| 2003/0079179 A1 * | 4/2003 | Brown et al. | 715/501.1 |
| 2004/0008894 A1 * | 1/2004 | Zeineh | 382/240 |
| 2004/0064471 A1 * | 4/2004 | Brown et al. | 707/100 |
| 2004/0066419 A1 * | 4/2004 | Pyhalammi | 345/864 |
| 2005/0138009 A1 * | 6/2005 | Deshpande | 707/3 |
| 2006/0074750 A1 * | 4/2006 | Clark et al. | 705/14 |
| 2006/0085743 A1 * | 4/2006 | Baudisch et al. | 715/526 |
| 2006/0173268 A1 * | 8/2006 | Mullick et al. | 600/407 |
| 2007/0257922 A1 * | 11/2007 | Kamata et al. | 345/501 |
| 2007/0288855 A1 * | 12/2007 | Rohrabaugh et al. | 715/760 |
| 2007/0294616 A1 * | 12/2007 | Kizaki | 715/526 |
| 2008/0183843 A1 * | 7/2008 | Gavin et al. | 709/217 |

FOREIGN PATENT DOCUMENTS

| | | |
|---|---|---|
| JP | 2002-318760 | 10/2002 |
| JP | 2003-37700 A | 2/2003 |
| JP | 2005-39475 | 2/2005 |
| JP | 2007-172196 | 7/2007 |
| JP | 2007-208511 | 8/2007 |
| JP | 2007-248775 | 9/2007 |

OTHER PUBLICATIONS

Japanese Official Action dated Nov. 10, 2009 with English translation.

* cited by examiner

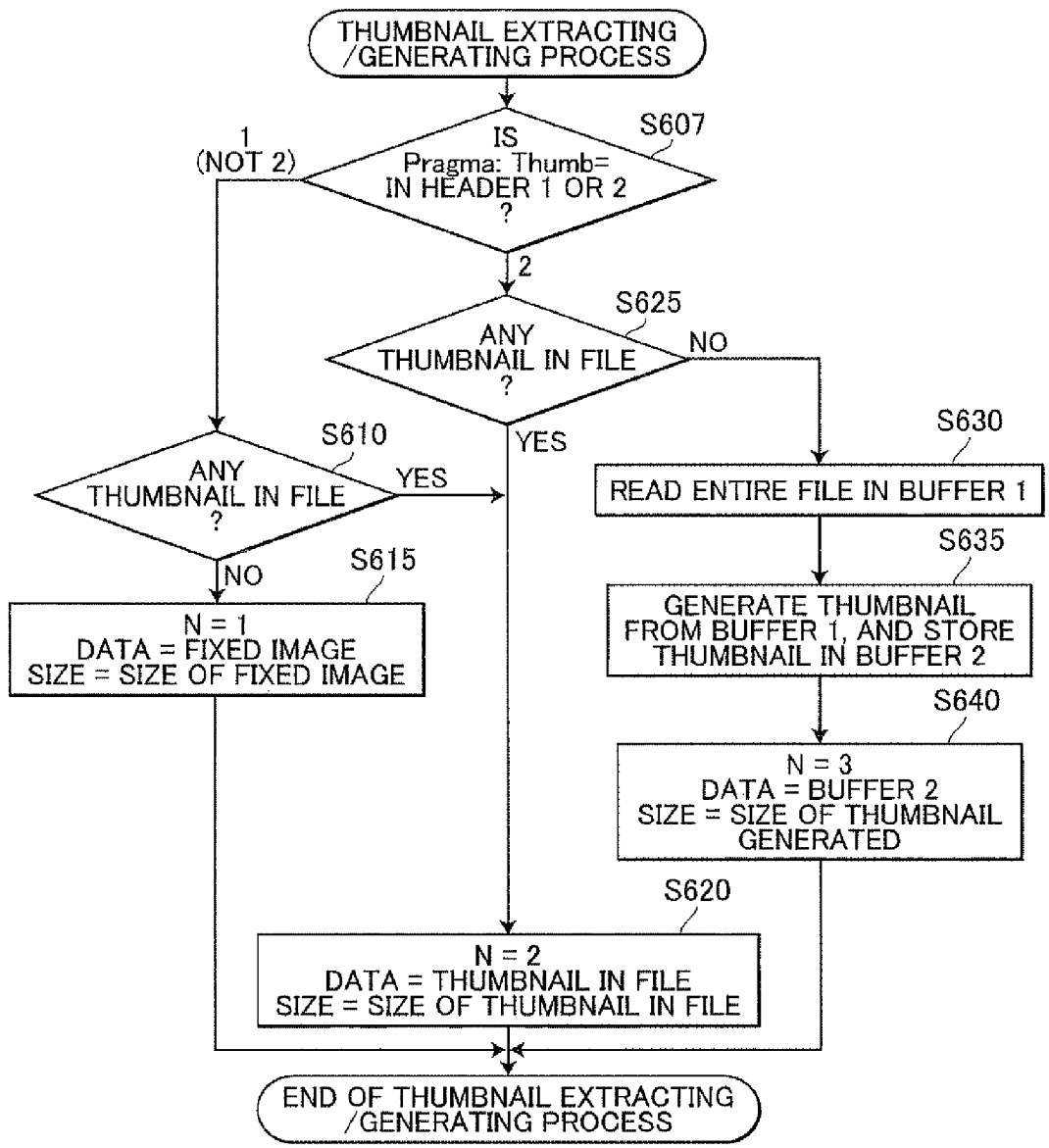

THUMBNAIL DISTRIBUTION SYSTEM, SERVER, CLIENT AND PROGRAM

CROSS REFERENCE TO RELATED APPLICATION

This application claims priority from Japanese Patent Application No. 2007-263363 filed Oct. 9, 2007. The entire content of this application is incorporated herein by reference.

TECHNICAL FIELD

The present invention relates to a thumbnail distribution system, a server and a client that constitute a thumbnail distribution system, and a program that causes a computer to function as the server or the client.

BACKGROUND

Japanese Patent Application Publication 2003-37700A proposes a system which includes a server and clients, each able to communicate with the server by utilizing HTTP, and in which any thumbnail (small image) that the server provides can be displayed on each client.

In the system disclosed in Japanese Patent Application Publication 2003-37700A, when a text linked on the web browser of any client is selected, the server transmits an HTML file to the client. Thereafter, the server transmits the thumbnails (bit-map files) linked by the HTML file to the client.

The HTML file and the thumbnails linked by the HTML file are displayed by the web browser of the client. A list of the thumbnails received from the server is thereby displayed. (refer to, e.g., paragraphs [0079], [0083] and of Japanese Patent Application Publication 2003-37700A.)

SUMMARY

In the system described above, the name and storage location of the file from which a thumbnail derives are known to any client in many cases. As the name indicates, HTTP is a protocol for transmitting and receiving hyper text files. In view of this, the client can request the transmission of the file if the name and storage location of the file are known to the client. However, since hyper texts have no concept of thumbnails, HTTP cannot enable the client to request the transmission of the thumbnail of the file even if the name and storage location of the file are known to the client.

In the system as described above, thumbnails are automatically generated in the server. Therefore, the client cannot know the file name or storage location of any thumbnail generated.

Inevitably, the client cannot request the distribution of the thumbnail of any file even if the client knows the name and storage location of the file, unless the client receives such an HTML file as mentioned above from the server.

The name of the file from which the thumbnail is derived may be known to the client. However, this alone cannot enable the client to request the server the thumbnail of the file.

The more thumbnails the client wants to acquire from the server, the more links in the HTML the client will need to receive from the server beforehand.

In the case where the server transmits a large number of links to the client, a load is exerted not only on the server that creates an HTML file having large number of links, but also on the client that receives the HTML file. Further, a considerable load is imposed on the network even if such an HTML file is transmitted to the client before transmitting the thumbnail.

In view of the above-described drawbacks, it is an objective of the present invention to provide a thumbnail distribution system in which any client can easily acquire a thumbnail from the server by virtue of HTTP if the client knows the name of the file from which the thumbnail derives, even if the server does not inform the client beforehand that the file is linked to the thumbnail. Another object of the invention is to provide a server and a client that constitute such a thumbnail distribution system, and also a program that causes a computer to function as the server or the client.

In order to attain the above and other objects, the present invention provides a thumbnail distribution system including a client device and a server communicatable with each other by using a hyper text transfer protocol (HTTP). A client device includes a request generating unit, a request transmitting unit, a response receiving unit, and a data processing unit. The request generating unit generates an HTTP request having a request line storing a file name of a file store in a storing unit. The request transmitting unit transmits the HTTP request. The response receiving unit receives an HTTP response having a response body storing a thumbnail corresponding to the file having the file name stored in the request line. The data processing unit performs a data processing based on the thumbnail stored in the response body. The request receiving unit receives the HTTP request transmitted from the request transmitting unit. The response generating unit generates the HTTP response based on the HTTP request. The response transmitting unit transmits the HTTP response to the response receiving unit.

Another aspect of this invention provides a server communicatable with a client device by using a hypertext transfer protocol (HTTP). The client device includes: a request generating unit generating an HTTP request having a request line storing a file name of a file store in a storing unit; a request transmitting unit transmitting the HTTP request; a response receiving unit receiving an HTTP response having a response body storing a thumbnail corresponding to the file having the file name stored in the request line; and a data processing unit performing a data processing based on the thumbnail stored in the response body. The server includes a request receiving unit, a response generating unit, and a response transmitting unit. The request receiving unit receives the HTTP request transmitted from the request transmitting unit. The response generating unit generates the HTTP response based on the HTTP request. The response transmitting unit transmits the HTTP response to the response receiving unit.

Another aspect of this invention provides a client device communicatable with a server by using a hypertext transfer protocol (HTTP). The server includes: a request receiving unit receiving an HTTP request having a request line storing a file name of a file store in a storing unit; a response generating unit generating an HTTP response having a response body storing a thumbnail corresponding to the file having the file name stored in the request line based on the HTTP request; and a response transmitting unit transmitting the HTTP response. The client device includes a request generating unit, a request transmitting unit, a response receiving unit, a data processing unit. The request generating unit generates the HTTP request. The request transmitting unit transmits the HTTP request to the request receiving unit. The response receiving unit receives the HTTP response transmitted from the response transmitting unit. The data processing unit performs a data processing based on the thumbnail stored in the response body.

Another aspect of this invention provides a computer-readable storage medium storing a set of program instructions executable on a computer, the computer communicatable with a client device by using a hypertext transfer protocol (HTTP). The client device includes: a request generating unit generating an HTTP request having a request line storing a file name of a file store in a storing unit; a request transmitting unit transmitting the HTTP request; a response receiving unit receiving an HTTP response having a response body storing a thumbnail corresponding to the file having the file name stored in the request line; and a data processing unit performing a data processing based on the thumbnail stored in the response body. The set of program instructions includes: receiving the HTTP request transmitted from the request transmitting unit; generating the HTTP response based on the HTTP request; and transmitting the HTTP response to the response receiving unit.

Another aspect of this invention provides a computer-readable storage medium storing a set of program instructions executable on a computer, the computer communicatable with a server by using a hyper text transfer protocol (HTTP). The server includes: a request receiving unit receiving an HTTP request having a request line storing a file name of a file store in a storing unit; a response generating unit generating an HTTP response having a response body storing a thumbnail corresponding to the file having the file name stored in the request line based on the HTTP request; and a response transmitting unit transmitting the HTTP response. The set of program instructions includes: generating the HTTP request; transmitting the HTTP request to the request receiving unit; receiving the HTTP response transmitted from the response transmitting unit; and performing a data processing based on the thumbnail stored in the response body.

BRIEF DESCRIPTION OF THE DRAWINGS

The particular features and advantages of the invention as well as other objects will become apparent from the following description taken in connection with the accompanying drawings, in which:

FIG. 13 is a flowchart explaining the thumbnail-extracting/generating process in the second embodiment.

DETAILED DESCRIPTION

Embodiments of the present invention will be described with reference to several concrete examples.

(1) First Embodiment

A first embodiment will be described first.

(1.1) Overall Configuration of System

Figure 1:
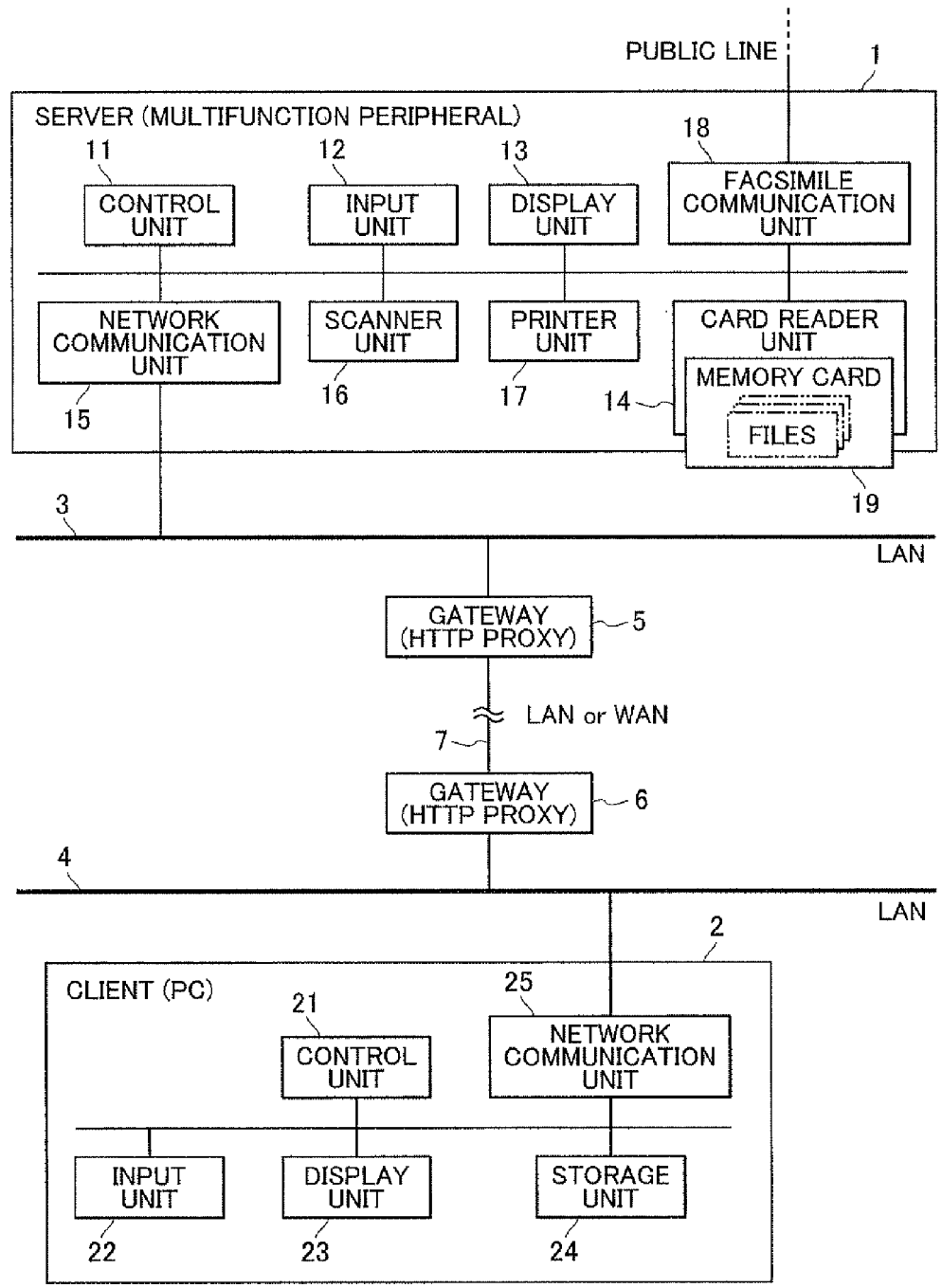
FIG. 1 is a block diagram showing the overall configuration of a thumbnail distribution system.

FIG. 1 is a block diagram showing the overall configuration of a thumbnail distribution system that is exemplified as a first embodiment of this invention.

This system includes a server 1 and a client 2 that are connected via a network. The server 1 is connected to a local area network (LAN) 3. The client 2 is connected to a LAN 4. The LANs 3 and 4 are connected to another network 7 (a LAN or a wide area network, WAN) via gateways 5 and 6, respectively. The gateways 5 and 6 have an HTTP proxy function.

The server 1 and the client 2 have a function as an HTTP server and a function as an HTTP client, respectively. They can communicate with the HTTP through the networks (LANs 3 and 4 and the other network 7).

Further, since the server 1 and the client 2 also conform to WebDAV, they have a function as a WebDAV server and a function as a WebDAV client, respectively, in addition to the function as the HTTP server and the function as the HTTP client.

In this embodiment, the server 1 is a multifunction peripheral (MFP). The server 1 includes a control unit 11, an input unit 12, a display unit 13, a card reader unit 14, a network communication unit 15, a scanner unit 16, a printer unit 17, and a facsimile communication unit 18.

The card reader unit 14 can hold a memory card 19. The server 1 can distribute files stored in the memory card 19 and thumbnails of the files to the client 2 when the control unit 11 performs the processes described later in detail.

In this embodiment, the client 2 is constituted by a personal computer (PC). The client 2 includes a control unit 21, an input unit 22, a display unit 23, a storage unit 24, and a network communication unit 25. The client 2 can activate software called card browser. The card browser has a function for displaying the thumbnails of the files stored in the memory card 19 provided in the server 1 and a function for transferring the files from the memory card 19 to the storage unit 24 of the client 2, by using HTTP.

The processes performed in the system described above will be briefly described below. The card browser installed in the client 2 achieves network setting for communicating the client 2 with the server 1 by using HTTP. As will be described later in detail, the card browser achieves other setting for enabling the client 2 to select files to be acquired among files stored in the server 1 and to inform the server 1 of a thumbnail-extracting order in which the thumbnails should be extracted.

When the user of the client 2 activates the card browser installed in the client 2, the card browser makes an HTTP access to the server 1 in accordance with the network setting to request the folder configuration of the memory card 19 to the server 1. In response to this request, the server 1 transmits the data indicating the folder configuration of the memory card 19 to the client 2. In the client 2, the card browser displays the folder configuration on the screen, based on the data indicating the folder configuration.

Then, when the user then selects an optional folder, the card browser requests the server 1 to transmit the thumbnails of the files stored in the selected folder after selecting the file in accordance with the thumbnail-extracting order that has been already designated. In response to the request, the server 1 transmits the thumbnails of the files stored in the selected folder to the client 2. In the client 2, the card browser displays the transmitted thumbnails on the screen.

When the user selects a desired thumbnail, the card browser requests the server 1 to transmit the file corresponding to the selected thumbnail. In response to the request, the server 1 transmits the requested file to the client 2.

(1.2) Functions and Processes in Client

The functions and processes the client 2 performs will be described.

[Process at Activation of Card Browser]

First, the process performed when the card browser is activated at the client 2 will be explained with reference to FIG. 2. The card browser is software that is activated in the client 2. The card browser has the function for displaying the thumbnails of the files stored in the memory card 19 and the function for transferring the files from the memory card 19 to the storage unit 24 of the client 2.

The card browser is activated when the user operates the input unit 22 of the client 2 to perform an input operation. Specifically, the card browser is activated, when the user clicks an icon corresponding to the card browser (hereinafter any similar operation shall be called merely "clicking") with a pointing device.

Figure 2:
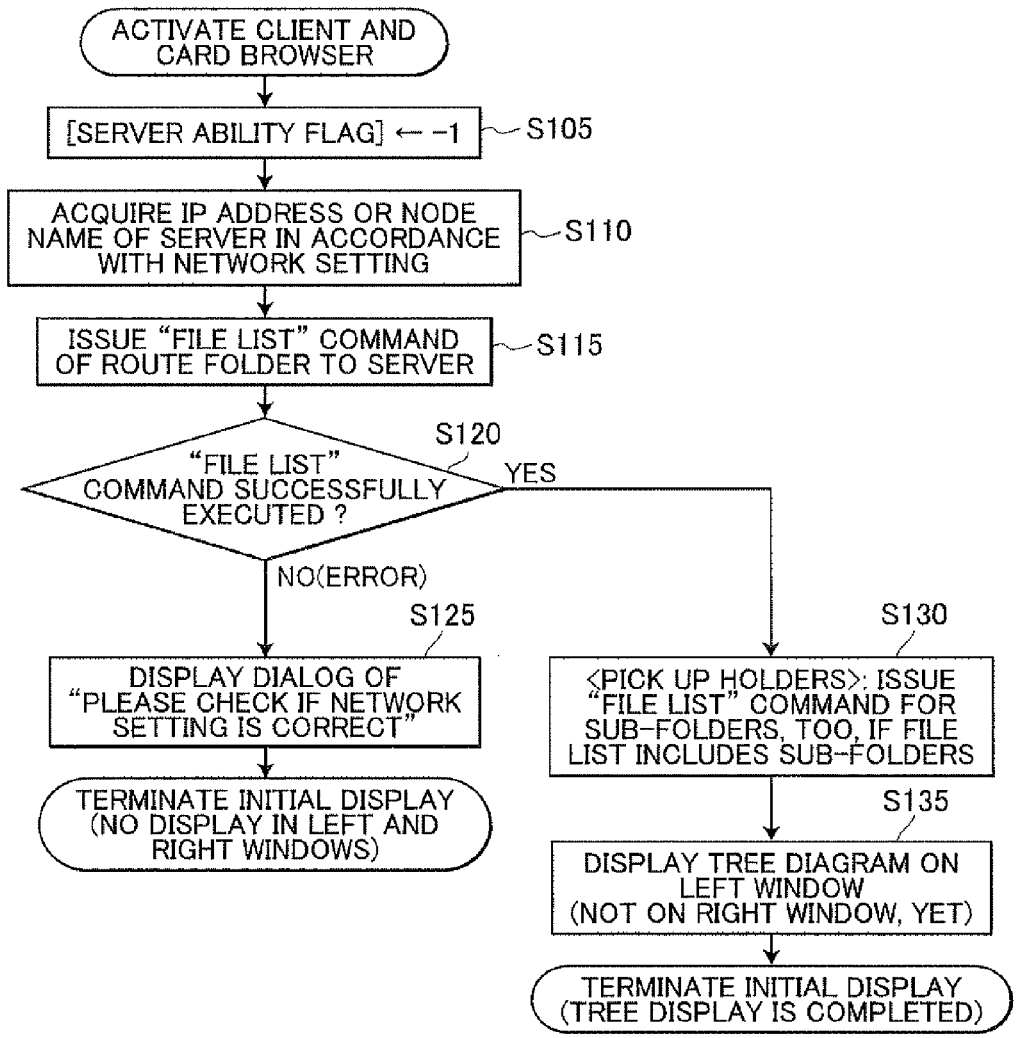
FIG. 2 is a flowchart explaining how the system operates when the card browser is activated.

When the card browser is thus activated, the client 2 starts the sequence of operation shown in FIG. 2. First, the client 2 sets the "server ability flag" to "−1" to initialize this flag (S105). Then, the client 2 acquires the IP address or node name of the server 1 based on the network setting to identify the communication partner for HTTP communication (S110).

Next, the client 2 issues a "file list" command for requesting a route folder files stored in the memory card 19 to the server 1 (S115), and then, determines whether or not the "file list" command has been successfully received by the server 1 (S120). If the "file list" command has not been successfully received by the server 1 (No in S120), any error message or no response is transmitted from the server 1. In this case, the client 2 displays a dialog window to give the user a message of "Please check if the network setting is correct" (S125). The initial display is then terminated.

Figure 3:
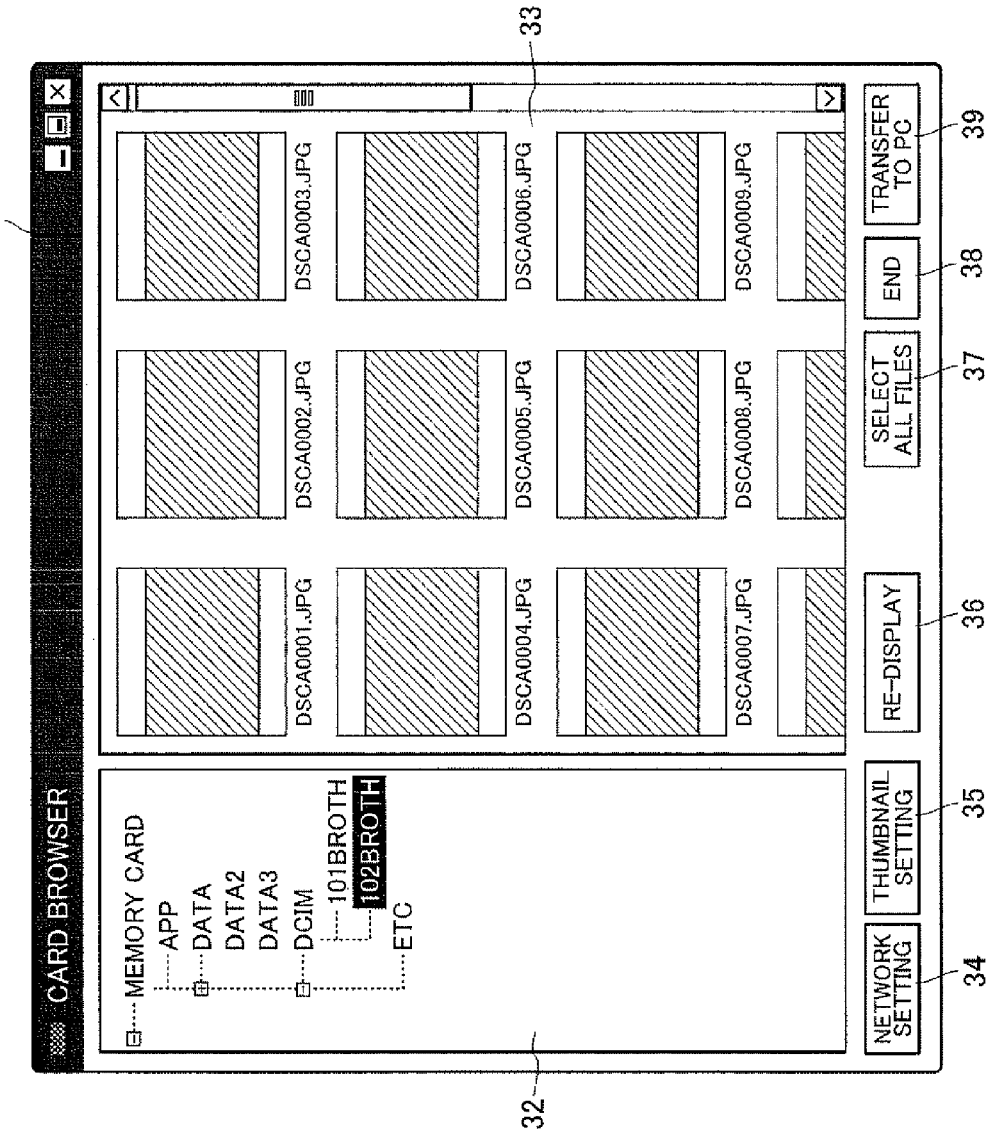
FIG. 3 is a diagram of the main menu screen of the card browser.

When the card browser is activated, the display unit 23 of the client 2 displays such a main menu screen 31 as shown in FIG. 3. In the main menu screen 31, two windows 32 and 33 and buttons 34 to 39 are arranged. If negative determination is made in Step S120, neither the left window 32 nor the right window 33 will be displayed in the main menu screen 31.

In this case, the user can input various setting items for achieving HTTP communication with the server 1 (for example, IP address, node name, etc.) by clicking the button 34 for "network setting". This communication setting scheme is not different from the scheme employed in general in software that performs HTTP-client function, and will not be explained any further.

If the "file list" command has been successfully received by the server 1 (Yes in S120), the client 2 acquires the file list, picks up only the folders from the file list in which the files and the folders are mixed (S130), and displays a tree diagram on the left window 32 (S135). Then, the initial display is terminated.

If the file list includes sub-folders, the client 2 issues a "file list" command for the sub-folders, too (S130). Basically, Step S130 is repeated as long as the folder contains sub-holders. However, if the process proceeds to so deep a sub-holder that no practical problems arise, the client 2 may not issue "file-list" command for the sub-holders in still deeper levels.

In the tree diagram shown in the left window 32, symbols "+" and "−" appear in the tree diagram if lower sub-holders exist below the folders displayed on the right of these symbols. In this case, nothing is also displayed in the right window 33.

[Function of Setting Thumbnails]

The thumbnail setting function that is enabled when the user clicks the "thumbnail setting" button 35 in the main menu screen 31 will be explained.

Figure 4:
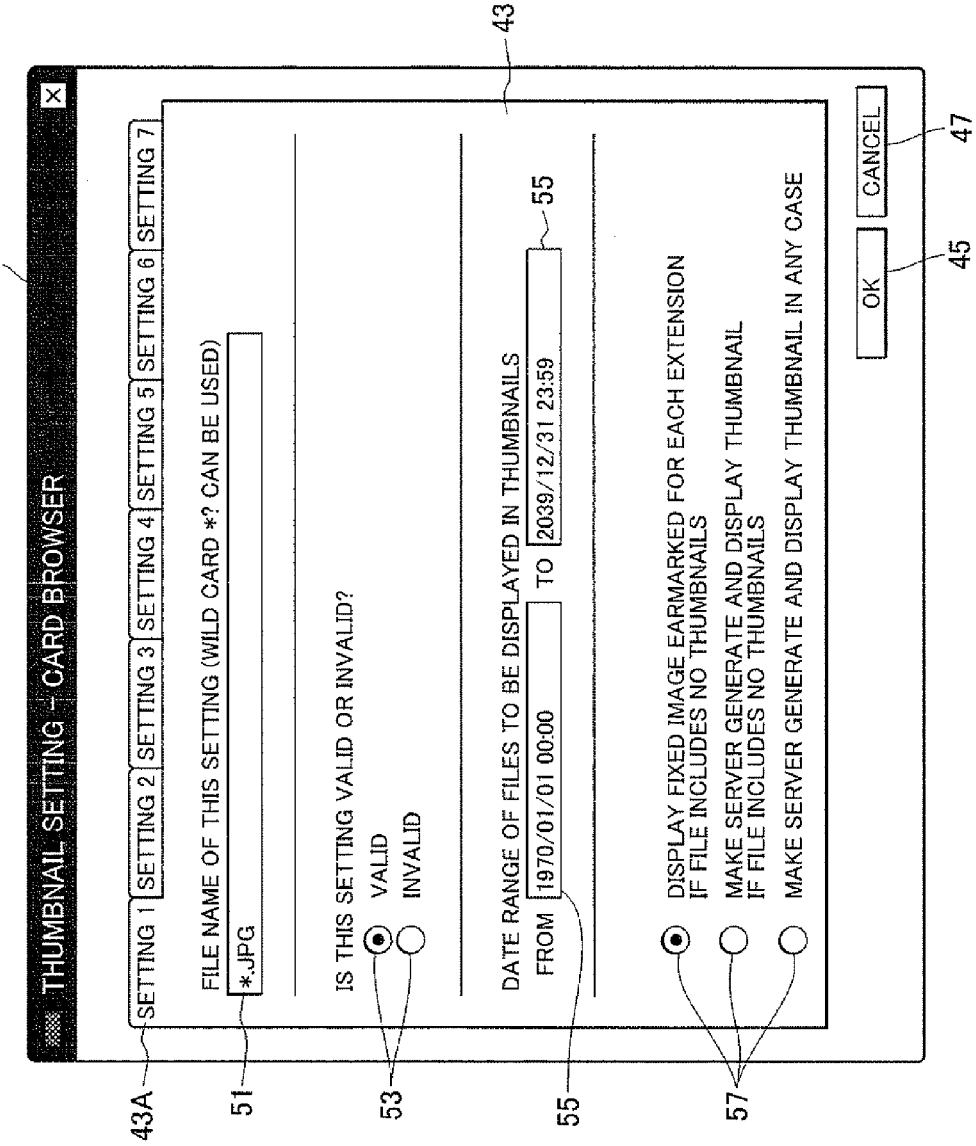
FIG. 4 is a diagram explaining the thumbnail setting screen of the card browser used in a first embodiment.

When the user clicks the "thumbnail setting" button 35 arranged in the main menu screen 31, the display unit 23 of the client 2 displays such a thumbnail-setting screen 41 as shown in FIG. 4. The user can set thumbnails by using the thumbnail-setting screen 41.

In the thumbnail-setting screen 41, a plurality of tab windows 43 (i.e., seven tab windows 43 corresponding to "setting 1" to "setting 7," in FIG. 4), and buttons 45 and 47 are arranged.

The tab windows 43 are displayed in an overlapping manner. When the user clicks the tab 43A displayed above any tab window 43, a tab window 43 associated with the tab 43A clicked appears forefront.

The same input items are prepared for each tab window 43. The user can therefore input, on each tab window 43, various conditions for narrowing down files that the card browser should display.

More specifically, the first input item is a file-name input column 51. The user can input the name of the file that should be displayed by the card browser, in the file-name input column 51. For example, "setting 1" shown in FIG. 4 indicates that only the file whose extension is ".JPG" is designated as a target of display by the card browser.

The second input item is a radio button 53 for validating or invalidating the setting. The user can select one of the two choices with the radio button 53. If the validation is selected, the setting displayed in the tab window 43 is validated. If the invalidation is selected, the setting displayed in the tab window 43 is invalidated.

Hence, with use of the radio button 53, the user can validate the tab window 43 again after invalidating the tab window 43, without being bothered with rewriting any other input items. That is, the user can switch valid or invalid of the setting with respect to each tab window 43.

The third input item is a date-condition input column 55. The user can input the date condition of the file that should be displayed by the card browser, in the date-condition input column 55. For example, the "setting 1" shown in FIG. 4 indicates that only the files dated in the period from "1970/01/01 00:00" to "2039/12/31" are designated as targets of display by the card browser.

The fourth input item is three radio buttons 57, each for setting a method for acquiring thumbnails. The user can select one of these radio buttons 57. The client 2 can acquire some kinds of thumbnails from the server 1. They are: (A) a fixed image that has been prepared by the server 1 (hereinafter called fixed image (A)); (B) a thumbnail that has been stored in a file previously and has been extracted from the file by the server 1 (hereinafter called extracted thumbnail (B)); and (C) a thumbnail that has been generated from data stored in a file by the server 1 (hereinafter called generated thumbnail (C)).

If the user desires to acquire the extracted thumbnail (B) when the file includes the thumbnail and to acquire the fixed image (A) when the file includes no thumbnails, he or she selects one of the radio buttons 57 which indicates "Display fixed image earmarked for each extension if file includes no thumbnails."

If the user desires to acquire the extracted thumbnail (B) when the file includes the thumbnail and to acquire the generated thumbnail (C) when the file includes no thumbnails, he or she selects one of the radio buttons 57 which indicates "Generate and display thumbnail in server if file includes no thumbnails."

Further, if the user desires to acquire the generated thumbnail (C) no matter whether the file includes the thumbnail, he or she selects one of the radio buttons 57 which indicates "Generate and display thumbnail in server in any case."

In the setting made in one tab window 43 as described above, the first to fourth items are handed as logic AND condition and constitute a set of settings. By contrast, the sets of settings, which correspond to the tab windows 43, respectively, are handled as logic OR conditions.

These settings described above are stored in the setting file provided in the client 2 as the user clicks the "OK" button 45 displayed in the thumbnail-setting screen 41, and are used in the process on the client side 2 described later. If the user clicks the "cancel" button 47, the thumbnail-setting screen 41 can be closed without updating the setting file provided in the client 2.

When the user clicks the "OK" button 45 or the "cancel" button 47, the dialog window is displayed for the user to confirm whether the setting may be updated or cancelled. The dialog window is neither shown nor described here, since such a dialog window is generally used in this type of software.

[Process in Operating Card Browser]

The process performed when the user operates the card browser at the client 2 will be explained with reference to FIG. 5. This process is performed continuously after the card browser finishes accomplishing the initial display described in FIG. 2.

When this process starts, the client 2 first waits for any input from the user. That is, the client 2 remains in standby state until the user selects a specific folder displayed in, for example, the tree diagram shown in the left window 32 (S205).

In Step S205, the user can perform various input operations. For example, the user may click the symbol "+" displayed in the left window 32. In this case, a sub-holder is displayed and the symbol changes to "−". If the user clicks the symbol "−", the sub-holder hitherto displayed disappears and the symbol changes to "+". Then, the symbol "+" alone indicates the existence of the sub-folder.

If the user clicks one holder in the left window 32, the name of the folder is reversely displayed (see folder "102BROTH" shown in FIG. 3) to indicate that the folder is in a selected state.

When the user selects a specific folder by performing such an input operation, the client 2 issues a "file-list" command for the folder (S210). The "file-list" command is then transmitted from the client 2 to the server 1, and the server 1 transmits the file list to the client 2 in response to the "file-list" command.

Upon receiving the file list, the client 2 picks up only the files from the file list including the files and the folders. Then, the client 2 displays icons and file names of all picked-up files in the right window 33 (S215).

The items including the icons and the file names are displayed not in a same manner as a web page prepared in the serve, but in a specific layout formulated by the card browser. That is, the card browser determines the display positions of the icons and the file names and displays them at these positions in the window 33. Thus, the card browser is different from the web browser that displays a web page including thumbnails laid out beforehand, not modifying the web page at all.

The icon displayed in the right window 33 at Step S215 is a temporary icon generated in the client 2 (hereinafter called "temporary icon (D)). The temporary icon (D) is different from the fixed image (A), extracted thumbnail (B) and generated thumbnail (C).

After performing Step S215, the client 2 determines a target to be processed as a first file (more precisely, initializing a loop counter) and starts processing of the first file (S220). Then, the client 2 determines whether or not the "server ability flag" for the first file is 0 (S225).

The "server ability flag" may be set to either "0" or "1" in the process described later. However, when performing Step S225 for the first time, the "server ability flag" has been set to "−1" in Step S105. Therefore, in this case, the "server ability flag" is found not to be "0" in Step S225 (No in S225). Then, the client 2 performs a "one file icon updating process" (S230). In the "one file icon updating process", a display of a file to be processed in the window 33 is updated with a thumbnail corresponding to the file and acquired from the server 1. The "one file icon updating process" will be later described in detail with reference to FIG. 6 and FIG. 7.

After performing Step S230, the client 2 determines whether the process is performed with respect to all files that should be processed (S235). If all files are not processed (No in S235), the operation returns to Step S225. At this point, the "server ability flag" is "1" or "0," since the flag has been updated in the "one file icon updating process" performed in Step S230. Therefore, after the "one file icon updating process" is performed in Step S225, the "server ability flag" is determined not to be "0" (No in S225) only if the "server ability flag" is "1". Thus, the client 2 performs the "one file icon updating process" again (S230).

As long as the "server ability flag" remains "1", Steps S225 to S235 are repeated. When the last file that should be processed is processed (Yes in S235), the process of FIG. 5 is terminated.

As a result, thumbnails acquired in the "one file icon updating process" are displayed in the right window 33. In other words, the temporary icon (D) displayed in the right window 33 is updated to the fixed image (A), the extracted thumbnail (B) or the generated thumbnail (C) by Steps S225 to S235.

Figure 5:
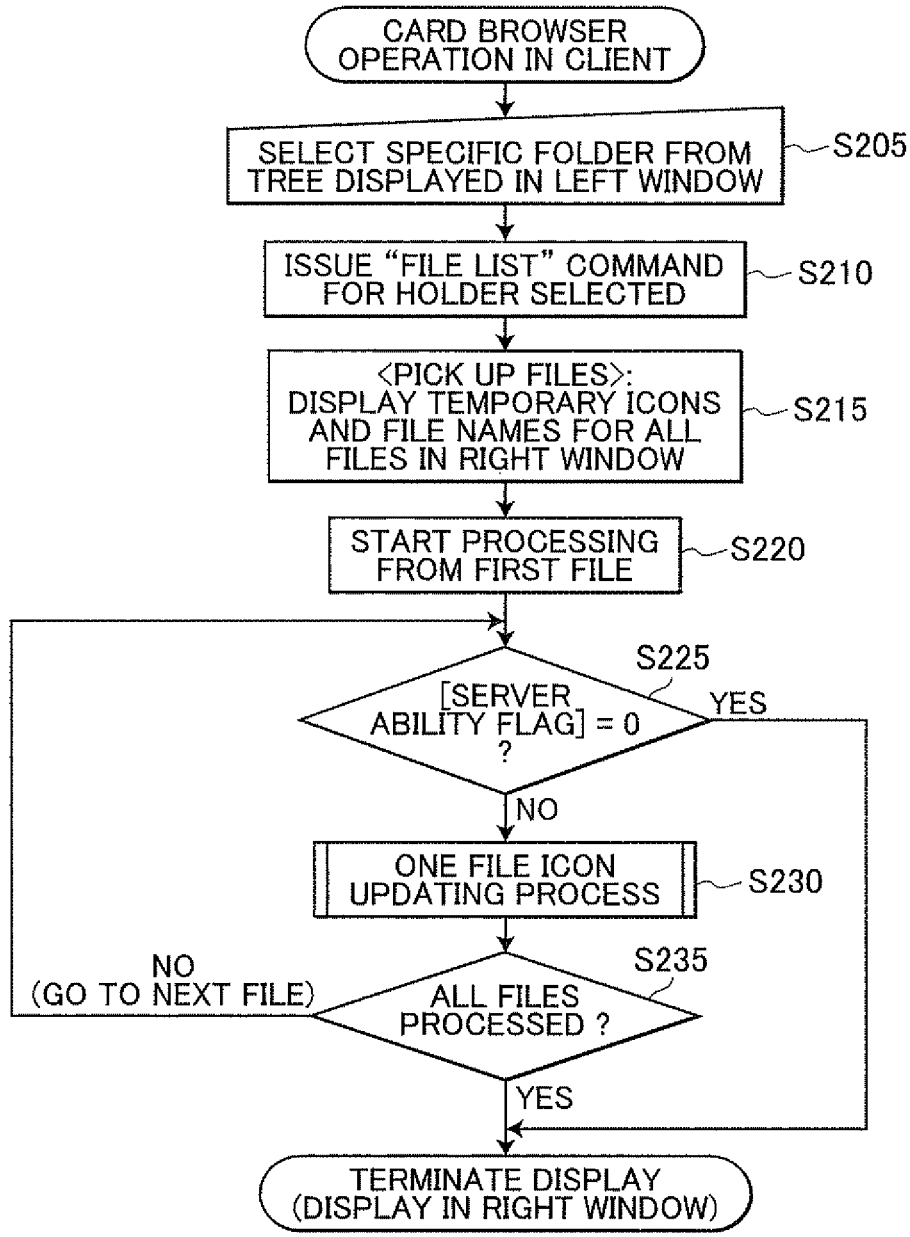
FIG. 5 is a flowchart explaining how the card browser operates.

On the other hand, if the "server ability flag" is set to "0" in the "one file icon updating process", the "server ability flag" is determined to be "0" in Step S225, and then, the process of FIG. 5 is terminated. However, "0" indicates that no thumbnails have been acquired from the server 1. Hence, the temporary icon (D) first displayed in Step S215 remains displayed in the right window 33.

Once the file (i.e., icon and file name) has been displayed in the right window 33, the user can click the file to select the file. After selecting the file, the user may click the "transfer to personal computer" button 39 to transfer the file selected from the server 1 to the client 2.

If the user clicks the "select all files" button 37 instead of clicking the files one at a time, all files displayed in the right window 33 can be selected altogether.

Moreover, if the user clicks the "re-display" button 36, the client 2 can acquire the latest data from the server 1, and the data displayed in the left window 32 or right window 33 is updated to the latest data. If the user clicks the "end" button 38, the card browser stops operating.

[One File Icon Updating Process]

The "one file icon updating process" performed in Step S230 will be described with reference to FIG. 6 and FIG. 7. In this process, the display of each file in the window 33 is update to a thumbnail acquired from the server 1.

In this process, the client 2 first initializes the loop counter in order to process the settings set in the thumbnail-setting screen 41 of "setting 1" firstly (S305).

Then, the client 2 determines firstly whether or not the setting is valid based on the setting selected by clicking the radio button 53 displayed in the thumbnail-setting screen 41 (S310), secondly whether or not the setting satisfies the file-name setting based on the content of the file-name input column 51 displayed in the thumbnail-setting screen 41 (S315), and finally whether or not the setting satisfies the date setting based on the content of the date-condition input column 55 displayed in the thumbnail-setting screen 41 (S320).

If at least one of these three conditions is not be satisfied (NO in at least one of No S310, S315 and S320), in Step S325, the client 2 determines whether or not all settings have been made. If all settings have not been made (No in S325), the operation returns to Step S310, and Steps S310, S315 and S320 are repeated. Thus, the settings made on the thumbnail-setting screen 41 are processed one after another.

Figure 6:
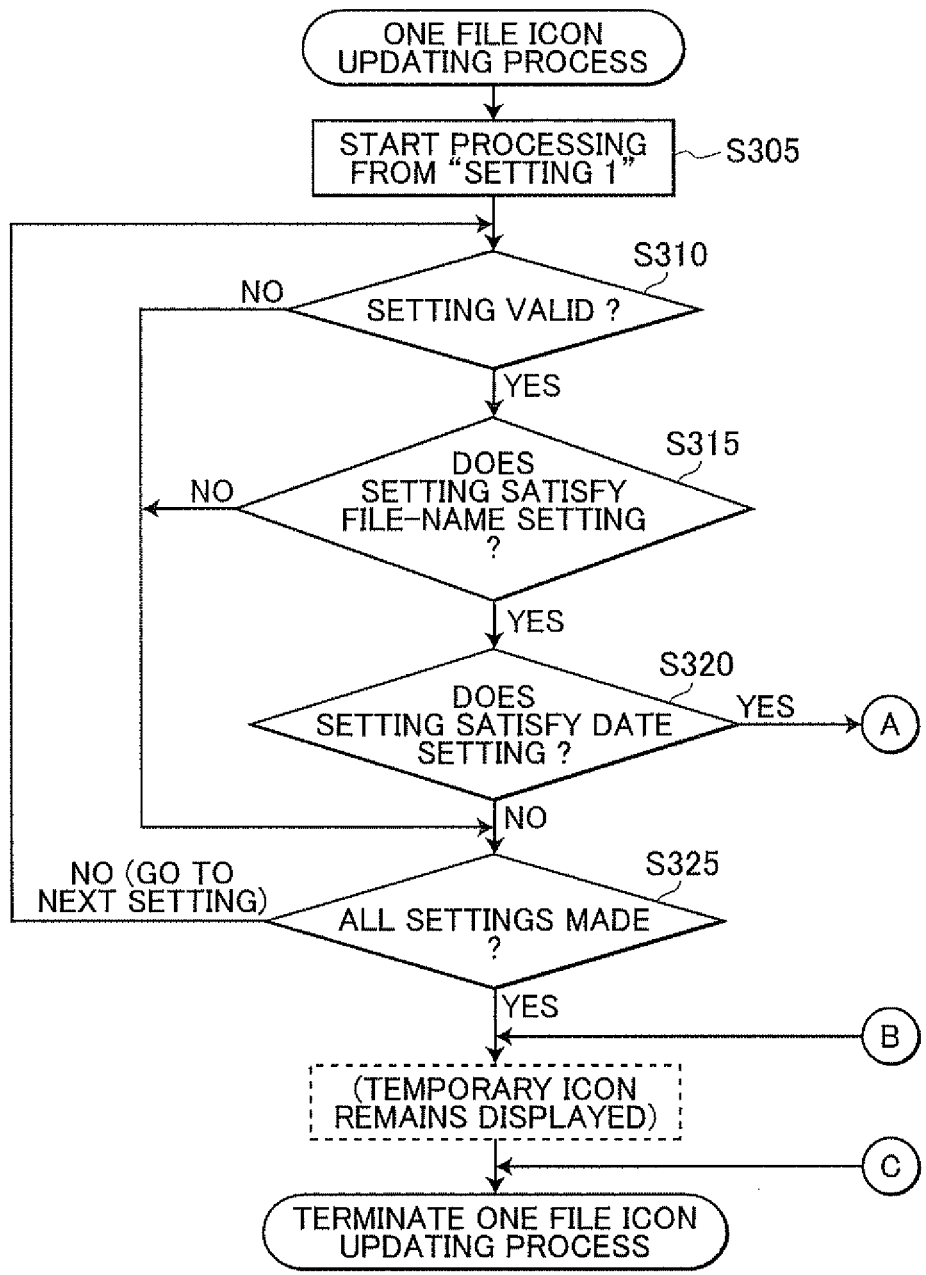
FIG. 6 is a flowchart explaining a process (first part) of updating a one file icon.
Figure 7:
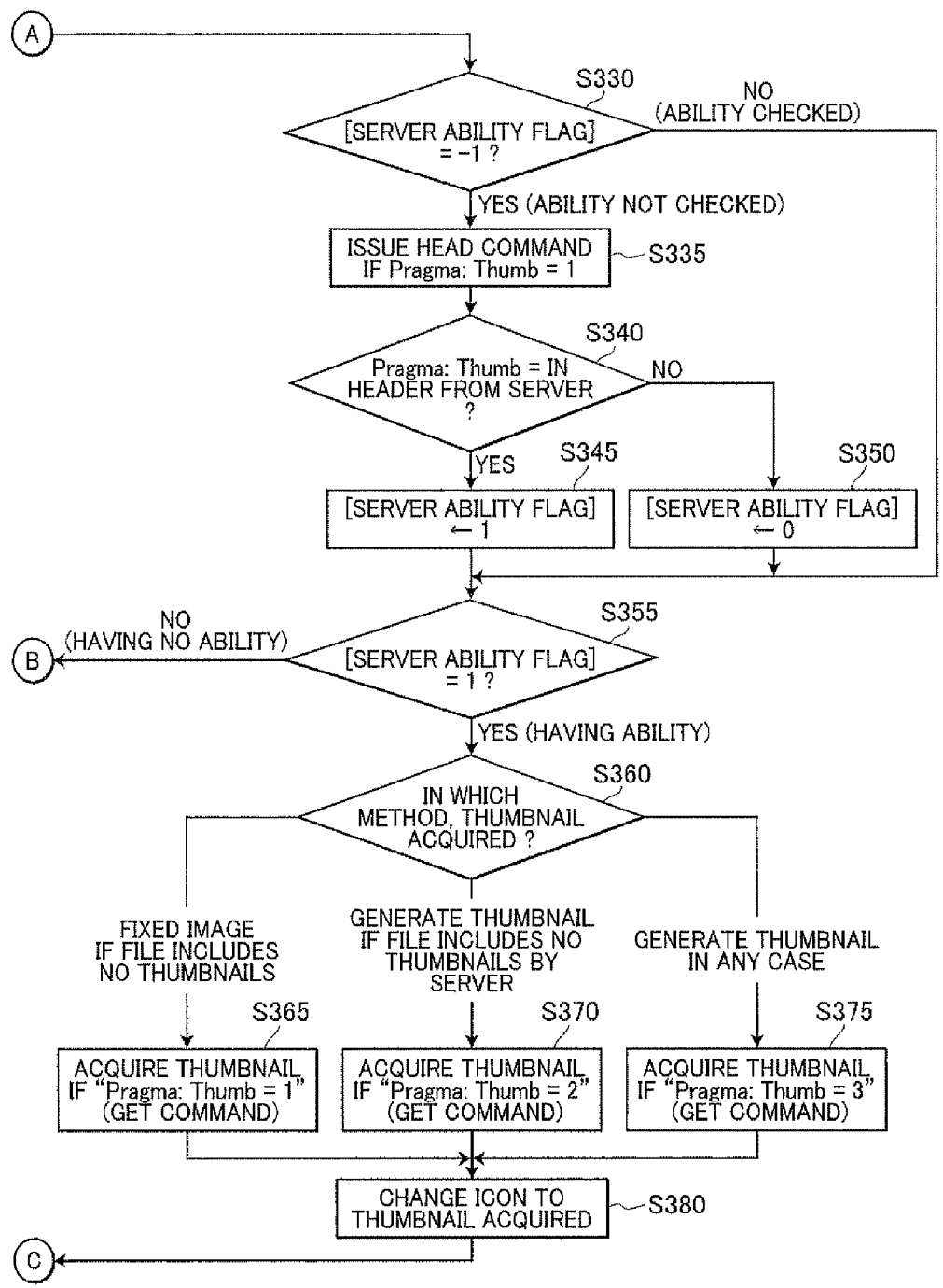
FIG. 7 is a flowchart explaining a process (second part) of updating a one-file icon in the first embodiment.

If all settings have been made (Yes in S325), the "one file icon updating process" shown in FIGS. 6 and 7 is terminated. In this case, the temporary icon (D) remains displayed in the right window 33 for the file that has been processed.

If the three conditions are satisfied (Yes in all of S310, S315 and S320), the operation goes to Step S330 shown in FIG. 7. Then, as shown in FIG. 7, the client 2 determines whether the "server ability flag" is "−1" or not (S330).

If the "server ability flag" is "−1" (Yes in S330), the ability of the server 1 has not been examined yet. In this case, the client 2 issues a HEAD command (HTTP request in which the method is set to HEAD, and a field value of a Pragma field is set to Thumb=1 (S335).

The HTTP request consists of text data of several lines. The first line is a request line in which data items such as method, URI and version are written. The second line and the following lines are request headers in which the field value of the Pragma field is written. Though the number of lines of the header is indefinite, the last line is followed by a vacant line (i.e., line having only a line-feed code) and the vacant line is followed by the request body.

Thus, in Step S335, the client 2 sets the method of the first request line to the HEAD command, provides the Pragma field in the request header, set the field value of the Pragma field to Thumb=1, and transmits the HTTP request, thus constituted, to the server 1.

In response to the HTTP request, the sever 1 analyzes the HTTP request, stores the "data showing that sever 1 has thumbnail providing function" in a response header of an HTTP response, and transmits the HTTP response to the client 2.

Figure 8:
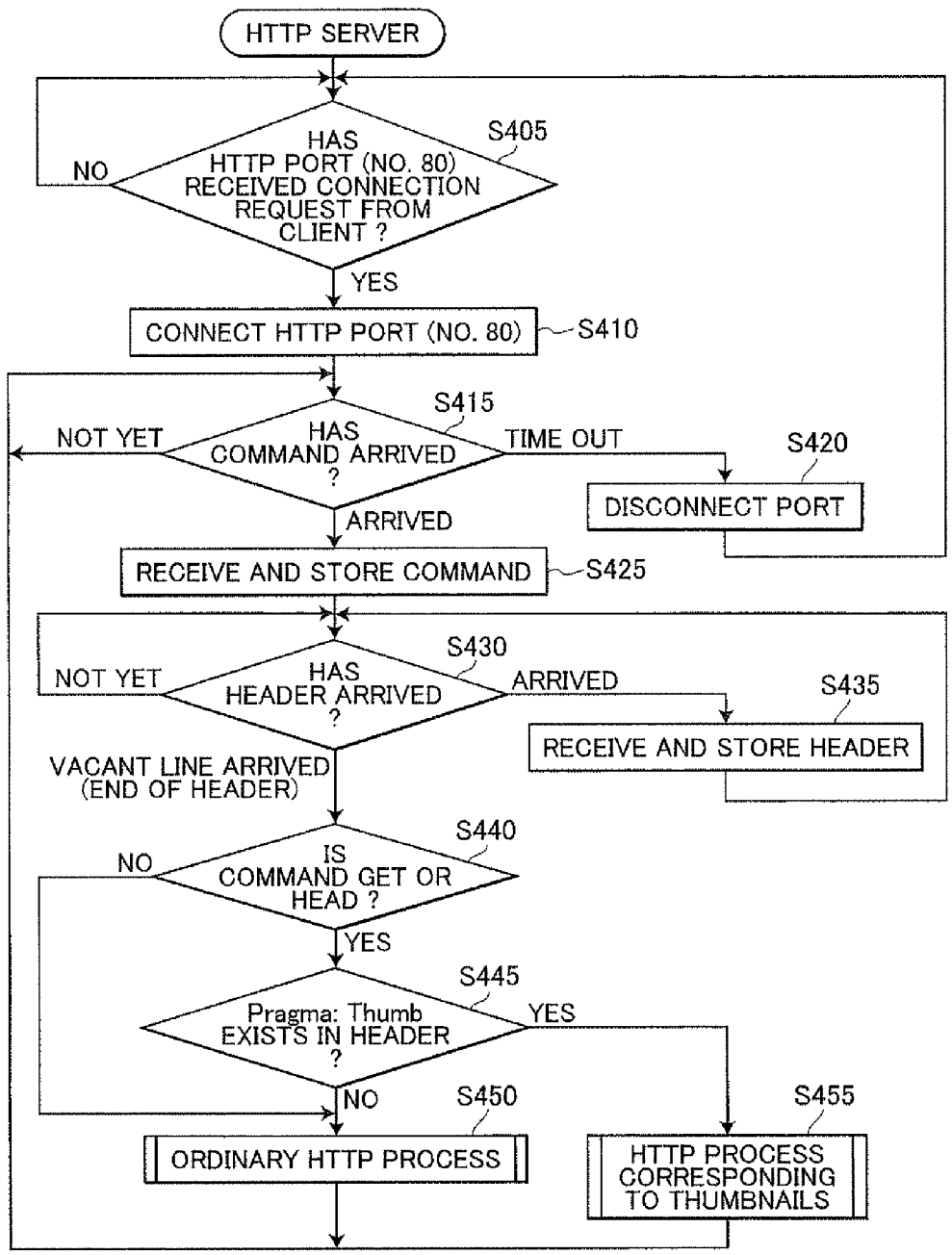
FIG. 8 is a flowchart explaining the process that the HTTP server performs.

Thumb=N (N is 1, 2 or 3) that is the field value of Pragma field provided in the response header indicates the "data showing that sever 1 has thumbnail providing function." The process performed in the server 1 will be explained later in detail with reference to FIG. 8 to FIG. 10.

In response to the HTTP response, the client 2 determines whether or not the Pragma filed is provided in the response header of the HTTP response and whether or not Thumb=N (N is 1, 2 or 3) is set as the field value (S340).

The HTTP response consists of text data of several lines. The first line is a status line. The second line and the following lines are response headers. Though the number of lines of the response header is indefinite, the last line is followed by a vacant line (i.e., line having only a line-feed code) and the vacant line is followed by a response body.

If the "Pragma: Thumb= . . . " is set as the field value (Yes in S340), the "server ability flag" is set to "1" (S345), and then, the operation then goes to Step S355. If the "Pragma: Thumb= . . . " is not set as the field value (No in S340), the "server ability flag" is set to "0" (S350), and then, the operation goes to Step S355.

Further, in Step S330, if the "server ability flag" is not "−1" (No in S330), the ability of the server 1 has been already examined. In this case, the operation jumps to Step S355, without executing Steps S335, S340 and S345.

In Step S355, the client 2 determines whether or not the "server ability flag" is "1" (S335). If the "server ability flag" is not "1" (No in S355), the server 1 has no function of providing thumbnails. In this case, the "one file icon updating process" shown in FIGS. 6 and 7 is terminated. Note that at this point, the temporary icon (D) remains displayed in the right window 33 for the file that has been processed.

On the other hand, if the "server ability flag" is "1" (Yes in S355), in Step S360, the client 2 determines a method of acquiring a thumbnail based on the setting selected with the radio button 57.

More specifically, if "Display fixed image earmarked for each extension if file includes no thumbnails" is selected, the client 2 sets the field value of the Pragma field in the request header to "Thumb=1", and issues a GET command (i.e., HTTP request in which GET is set for method) for acquiring thumbnails (S365).

If "Make server generate and display thumbnail if file includes no thumbnails" is selected, the client 2 sets the field value of the Pragma field in the request header to "Thumb=2", and issues a GET command (i.e., HTTP request in which GET is set for method) for acquiring thumbnails (S370).

If "Make server generate and display thumbnail in any case" is selected, the client 2 sets the field value of the Pragma field in the request header to "Thumb=3", and issues a GET command (i.e., HTTP request in which GET is set for method) for acquiring thumbnails (S375).

The server 1 analyzes the HTTP request including the GET command, stores, based on the field value of the Pragma field, the fixed image (A), extracted thumbnail (B) or generated thumbnail (C) in the response body, and transmits an HTTP response to the client 2. The process that the server 1 performs will be described later in detail with reference to FIG. 8 to FIG. 10.

In response to the HTTP response, the client 2 extracts the thumbnail (i.e., fixed image (A), extracted thumbnail (B) or generated thumbnail (C)) from the response body in the HTTP response; replaces the icon of the file to be processed, with the thumbnail acquired from the server 1 (S380), and then, the "one file icon updating process" shown in FIG. 6 and FIG. 7 is terminated. In this case, the temporary icon (D) displayed in the right window 33 is changed to the fixed image (A), the extracted thumbnail (B) or the generated thumbnail (C) for the file that has been processed.

(1.3) Functions and Processes in Server

The functions and processes that the sever 1 performs will be described.

[HTTP Server Process]

The HTTP server process that the sever 1 performs will be described with reference to FIG. 8. The HTTP server process is a process that the sever 1 usually performs.

On starting this process, the sever 1 determines whether or not the HTTP port (No. 80) has received a connection request from the client 2 (S405). If no connection requests have been received (No in S405), Step S405 is repeated and the sever 1 waits for a connection request from the client 2. If a connection request has been received (Yes in S405), the HTTP port (No. 80) is connected to the client 2 (S410).

Next, the server 1 determines whether a command has arrived from the client 2 (S415). Specifically, the command is contained in the HTTP request transmitted from the client 2, and the server 1 determines the command has arrived from the client 2 when the first line consisting the request line of the HTTP request is transmitted from the client 2.

Of the commands that the sever 1 may receive in Step S415, those that are important to this system are, for example, the HEAD command that the client 2 issues in Step S335 and the GET command that the client 2 issues in Step S365, S370 or S375. Various commands other than these exemplified commands may come to the sever 1 from the client 2.

If no commands have arrived, Step S415 is repeated and the server 1 waits for a command from the client 2. If no commands come from the client 2 over a prescribed time, the server 1 determines to be "Time out", and disconnects the port (S420). Then, the operation returns to Step S405.

If a command has arrived, the server 1 stores the command (S425). Specifically, the server stores the above-mentioned request line as a command transmitted from the client 2.

Subsequently, the server 1 determines whether a header (request header) has arrived (S430). Like the above-mentioned request line, the header is contained in the HTTP request transmitted from the client 2, and the sever 1 determines the header has arrived if one-line data corresponding to part of the header has been transmitted from the client 2.

If no headers have arrived, Step S430 is repeated until a header will come from the client 2. If a header has arrived, the sever 1 stores the header (S435), and then, returns to Step S430.

The operation returns from Step S435 to Step S430, since the header is described over several lines. Though the number of lines of the header is indefinite, the last line is followed by a vacant line (consisting of only a line-feed code). Therefore, the server 1 can determine the last line of the header when the vacant line has arrived.

Hence, in Step S430, the server 1 determines, until detecting the vacant line, that the header has arrived, and Steps S430 to S450 are repeated. Thus, data items for several lines, which correspond to the header, are accumulated.

In Step S430, if a vacant line has arrived, the header has been completed. In this case, the server 1 determines whether or not the command is either GET or HEAD (S440). More precisely, the server 1 determines whether or not the character train representing the method descried in the request line stored by the processing S425 is either GET or HEAD is determined.

If the command is either GET or HEAD (Yes in S440), the server 1 determines whether or not the header includes a character train "Pragma: Thumb=" (S445). "Pragma: Thumb=" is a character train that can be described in any line of the header composed of several data lines. If this character train is described in the header, thumbnail-requesting data that requests thumbnails is stored in the header.

If the command is neither GET nor HEAD in Step S440 (No in S440), or if the header does not include a character train "Pragma: Thumb=" (No in S445), an ordinary HTTP process is performed (S450). The process performed in Step S450 is one that the HTTP sever of known type performs, and will not described here in detail.

If the command is either GET or HEAD (Yes in S440) and if the header includes a character train "Pragma: Thumb=" (Yes in S445), an "HTTP process corresponding to thumbnails" is performed (S455).

Note that the command is GET and the header includes the character train "Pragma: Thumb=" when the client 2 has performed Step S365, S370 or S375. Also note that the command is HEAD and the header includes the character train "Pragma: Thumb=" when the client 2 has performed Step S335.

In the "HTTP process corresponding to thumbnails" performed in Step S455 is a process for transmitting a thumbnail to the client 2 as requested by the client 2. The "HTTP process corresponding to thumbnails" will be described later in detail with reference to FIG. 9 and FIG. 10.

After the "ordinary HTTP process (S450)" or the "HTTP process corresponding to thumbnails (S455)" has been performed, the operation returns to Step S415. In Step S415, the server 1 again waits for an HTTP request coming from the client 2. When an HTTP request is transmitted to the server 1, Step S425 and subsequent steps are repeated. If no HTTP request is transmitted to the server 1, Step S420 is performed, and the operation then returns to Step S405. In Step S405, the server 1 waits for a connection request from the client 2.

[HTTP Process Corresponding to Thumbnails]

The "HTTP process corresponding to thumbnails" performed in Step S455, will be explained in detail with reference to FIG. 9 and FIG. 10.

When the "HTTP process corresponding to thumbnails" is started, the sever 1 first performs a "thumbnail extracting/generating process" for each file (S505). The "thumbnail extracting/generating process" is performed in such a sequence as detailed in the flowchart of FIG. 10.

The process will be explained with reference to FIG. 10. The server 1 determines which of "1", "2" or "3" is the character following the character train "Pragma: Thumb=" included in the header (S605). More precisely, any value other than "2" and "3" is regarded as "1" in the present embodiment.

If the character is "1" in S605, the server 1 determines whether or not the file to be processed includes a thumbnail (S610). A file does not necessarily include thumbnails even if the file has such a format that can include thumbnails. Hence, in Step S610, the server 1 determines firstly whether the file has such a format that can include thumbnails, and then, whether the file actually includes thumbnails is determined. The name of the file is stored in the request line stored in Step S425 as a character train that corresponds to URI.

Of the existing image files relatively well known in the art, JPG-format files and BMP-format files can be exemplified as those that may include thumbnails. However, the format of any file from which thumbnails may be extracted is not limited to a particular one. Any file having such data configuration that thumbnails are included in one form or another and can be extracted by the server 1 can be used.

If the file includes no thumbnails (No in S610) the server 1 stores items N=1, DATA=data of fixed image, and SIZE=size of fixed image in the HTTP response (S615). The fixed image is data that the server 1 transmits to the client 2 when the file includes no thumbnails. Which image should be used as the fixed image is prescribed for the extension of the file.

If the file includes a thumbnail (Yes in S610), the server 1 stores items N=2, DATA data of the thumbnail included in the file, and SIZE=size of the thumbnail included in the file in the HTTP response (S620).

If the character is "2" in S605, the server 1 also determines whether or not the file includes a thumbnail (S625). If the file includes a thumbnail (Yes in S625), the server 1 stores items N=2, DATA=data of the thumbnail included in the file, and SIZE=size of the thumbnail included in the file in the HTTP response (S620).

If the file includes no thumbnails (No in S625), the server 1 reads the entire file into a buffer 1 (S630), and generates a thumbnail from the data stored in the buffer 1 and stores the thumbnail in a buffer 2 (S635). In other words, the server 1 generates the thumbnails with the two buffers provided in the memory.

Then, the server 1 stores the items N=3, DATA=data of the thumbnail generated newly and stored in the buffer 2, and SIZE=size of the thumbnail generated newly in the HTTP response (S640).

If the character is "3" in S605, the process also goes to Step S630. The sever 1 reads the entire file into the buffer 1 (S630), generates a thumbnail from the data stored in the buffer 1, and stores the thumbnail in a buffer 2 (S635), and stores the items N=3, DATA=data of the thumbnail generated newly and stored in the buffer 2, and SIZE=size of the thumbnail generated newly in the HTTP response (S640).

Figure 9:
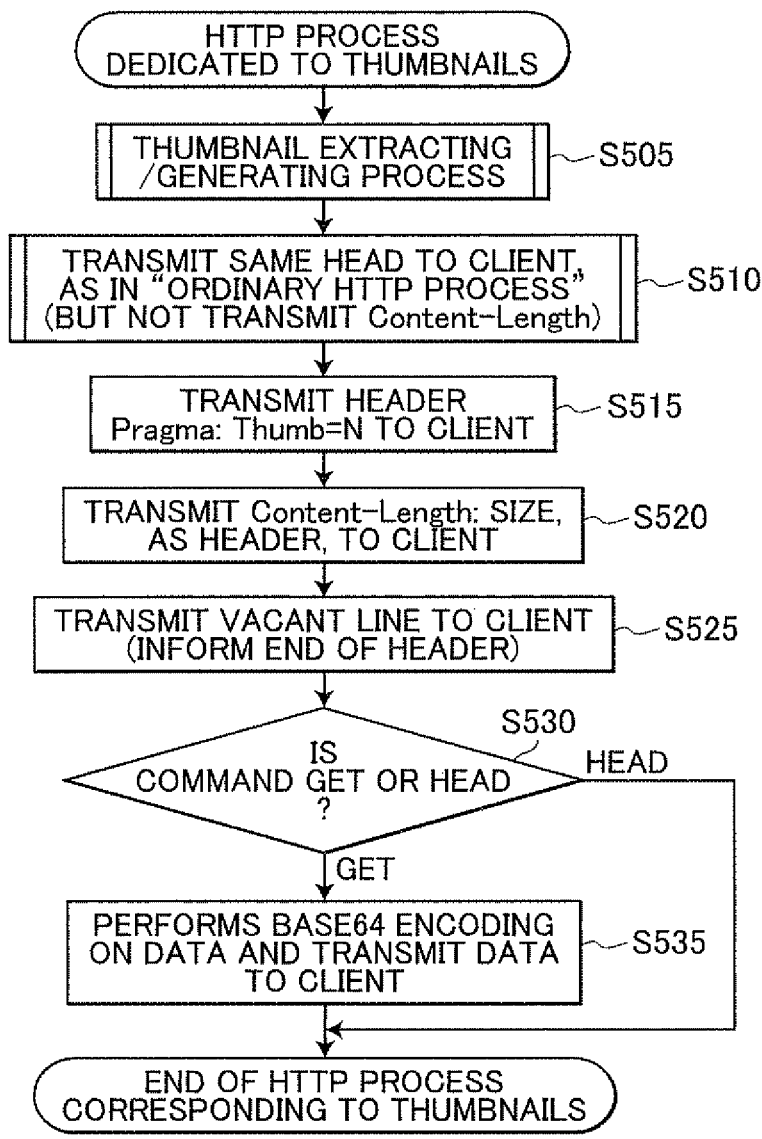
FIG. 9 is a flowchart explaining an HTTP process corresponding to thumbnails.
Figure 10:
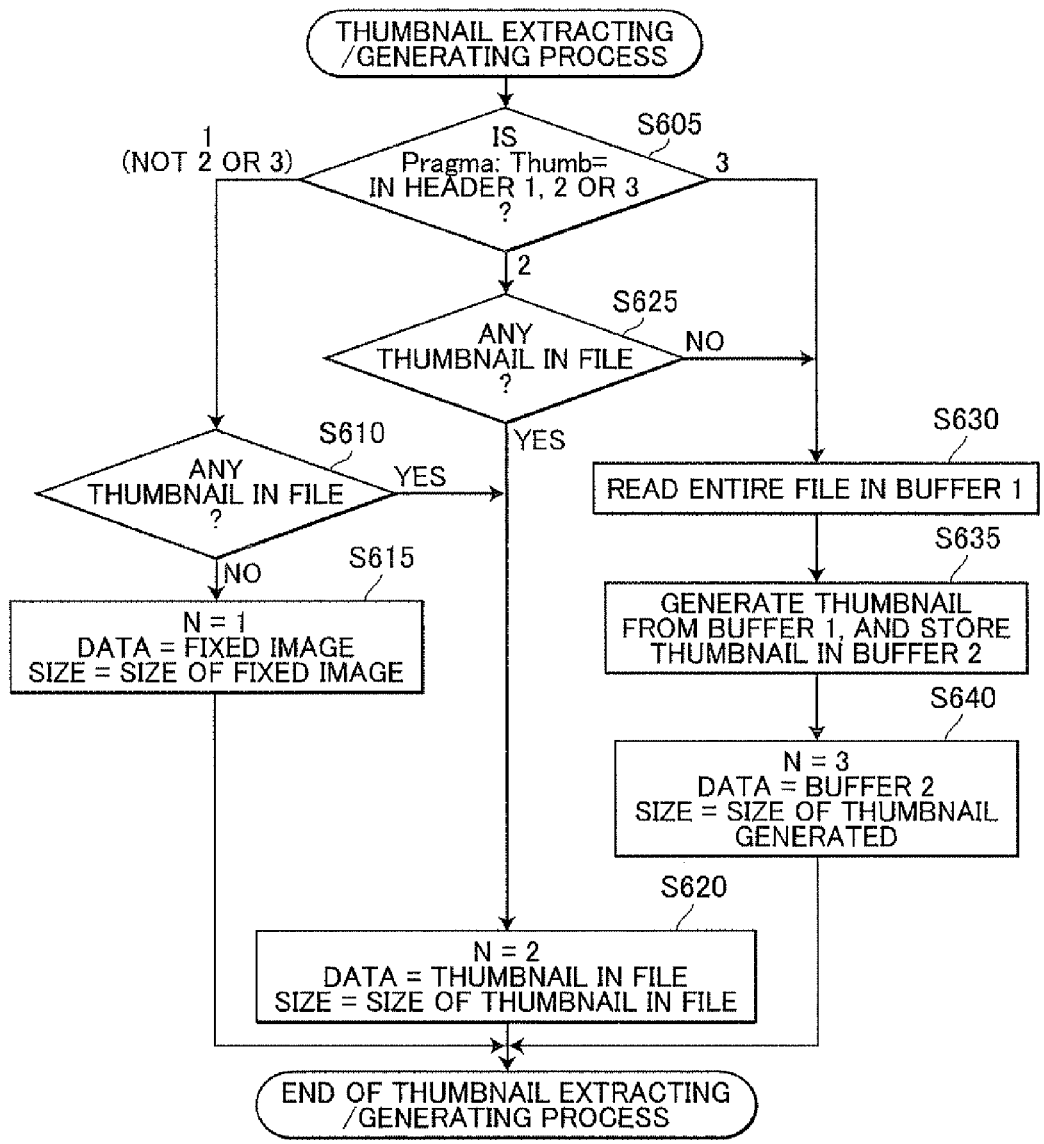
FIG. 10 is a flowchart explaining the thumbnail-extracting/generating process in the first embodiment.

Thus, specific data items are stored as N, DATA and SIZE, and then, the "thumbnail extracting/generating process" shown in FIG. 10 is terminated, that is, Step S505 shown in FIG. 9 is thus completed. The process shown in FIG. 9 will be explained further.

After performing the process of Step S505, the server 1 performs Steps S510, S515, S520, S525, S530, and S535 in the order mentioned. To be more specific, the server 1 transmits the same header to the client 2, as in the "ordinary HTTP process (S450)" (S510). In Step S510, however, the server 1 does not transmit a Content-Length field described later.

The server 1 then transmits Pragma: Thumb=N to the client 2, as part of the response header (S515). That is, in Step S515, the server 1 provides a Pragma field in the response header, stores Thumb=N as field value, and transmits Thumb=N to the client 2. "Thumb=" included in the character train constituting the field value is a fixed part. "N" is value N set in Step S615, S620 or S640 in FIG. 10. More precisely, "N" is any one of "1", "2", or "3".

Then, the server 1 transmits Content-Length: Size, as part of the header (response header), to the client 2 (S520). That is, in Step S515, the server 1 provides a Content-Length field in the response header, stores SIZE as the field value, and transmits the response header to the client 2. SIZE included in the field value is the value SIZE (numerical value expressed as a character train) that has been set in Steps S615, S620, or S640.

Next, the server 1 transmits a vacant line to the client 2 to inform the client 2 of the termination of the header (S525). The server 1 then determines whether the command is either GET or HEAD (S530). More specifically, the server 1 determines which of GET or HEAD the character train representing the method in the request stored in Step S425 is.

If the command is GET in S530, the server 1 performs BASE64 encoding on DATA and transmits DATA to the client 2 (S535). At this point, the process shown in FIG. 9 is terminated. DATA to be transmitted is DATA set in Step S615, S620 or S640. This DATA is transmitted as a response body that constitutes part of the HTTP response. BASE64 is a known encoding scheme that is utilized in HTTP communication.

If the command is HEAD in S530, the process of FIG. 9 is terminated, without performing Step S535. Only the response header is transmitted to the client 2 as HTTP response. The response body is not transmitted to the client 2.

By performing Steps S510, S515, S520, S525, S530 and S535, the server 1 transmits the HTTP response to the client 2.

When the HTTP response reaches the client 2, the client 2 performs Steps S340 to determine, based on the data in the response header, whether the server 1 has the function for providing thumbnails.

Alternatively, when the HTTP response reaches the client 2, the client 2 performs Step S380 to extract a thumbnail (i.e., fixed image (A), extracted thumbnail (B) or generated thumbnail (C)) from the response body. The icon of the file being processed is thereby changed to the thumbnail acquired from the server 1.

(1.4) Advantages of First Embodiment

In the thumbnail distribution system described above, by designating a file, the client 2 can acquire a thumbnail corresponding to the file.

Therefore, the client 2 can acquire a thumbnail from the server 1 even if the user of the client 2 does not know the name of the thumbnail, only if the user knows the name of the file from which the thumbnail has derived.

Hence, the client 2 can easily acquire the thumbnail. That is, the user of the client 2 need not be bothered with such troublesome work as receiving data such as an HTML file from the server 1 beforehand and then tracing the links described in the data. Since the server 1 need not transmit data such as an HTML file to the client 2 before transmitting the thumbnail, the load on the network can be reduced.

Further, in this thumbnail distribution system, the user can designate, the client 2 side, any file whose thumbnail the user of the client 2 wants. Hence, the load on the server 1 and the network is smaller than in the case where all thumbnails are transmitted from the server 1 to the client 2 although the client 2 does not request for any particular thumbnail.

In addition, the client 2 can acquire thumbnails via a proxy server or a relay server that correspond to HTTP, since the system can use the HTTP that is widely used in the art.

Further, in the thumbnail distribution system described above, the client 2 can select the file that he or she wants, based on the file data (file name and date) stored in the memory card 19 incorporated in the server 1, to acquire any thumbnail from the server 1. Moreover, one or more thumbnails that the client 2 has acquired can be displayed arbitrarily at the positions that the card browser that is the software installed in the client 2 designates.

Thus, the layout of thumbnails can therefore be optimized for the client 2, unlike in a system in which a web page having thumbnails laid out by the server 1 is displayed on the client 2 side without change.

Still further, in the thumbnail distribution system described above, the thumbnail-requesting data is stored in the HTTP request as the field value of the Pragma header field. The field value of the Pragma header field is therefore reliably preserved in view of the HTTP standards, even if thumbnails are transmitted via various relay servers. The client 2 can therefore reliably transmit data to the server 1.

Moreover, in the thumbnail distribution system described above, the data transmitted from the server 1 as HTTP response can be verified to be a thumbnail based on the response header. Therefore, the client 2 need not verify the data transmitted as a response body from the server 1.

Furthermore, in the thumbnail distribution system described above, thumbnail providing data is stored in the HTTP response as the field value of the Pragma header field. Therefore, the field value of the Pragma header field is reliably preserved in view of the HTTP standards, even if thumbnails are transmitted via various relay servers. The server 1 can therefore reliably transmit data to the client 2.

In the thumbnail distribution system described above, by utilizing the HEAD command, whether the server 1 has the thumbnail providing function is determined based on the response header without transmitting a response body.

In addition, in the thumbnail distribution system described above, if a file includes a thumbnail, the sever 1 can provide the client 2 with the thumbnail included in the file. If the file includes no thumbnails, the server 1 can provide the client 2 with any thumbnail prepared in advance. Further, if the file includes no thumbnails, the server 1 can generate a thumbnail based on the file and provide the generated thumbnail to the client 2. Alternatively, the server 1 may generate a thumbnail based on the file and provide the generated thumbnail to the client 2, no matter whether the file includes thumbnails.

The user can select any possible combination of these methods of acquiring thumbnails, merely by operating the radio buttons 57. Thus, the server 1 can generate any thumbnail that the user wants and can provide the generated thumbnail to the client 2.

(2) Second Embodiment

A second embodiment of the invention will be described. Most components of the second embodiment are identical in configuration to the components of the first embodiment described above. Therefore, the components identical to those of the first embodiment are designated at the same reference numbers and will not be described in detail.

(2.1) Functions and Processes in the Client

The functions and processes that the client 2 performs will be described, mainly the components that differ from their counterparts of the first embodiment.

[Function of Setting Thumbnails]

Figure 11:
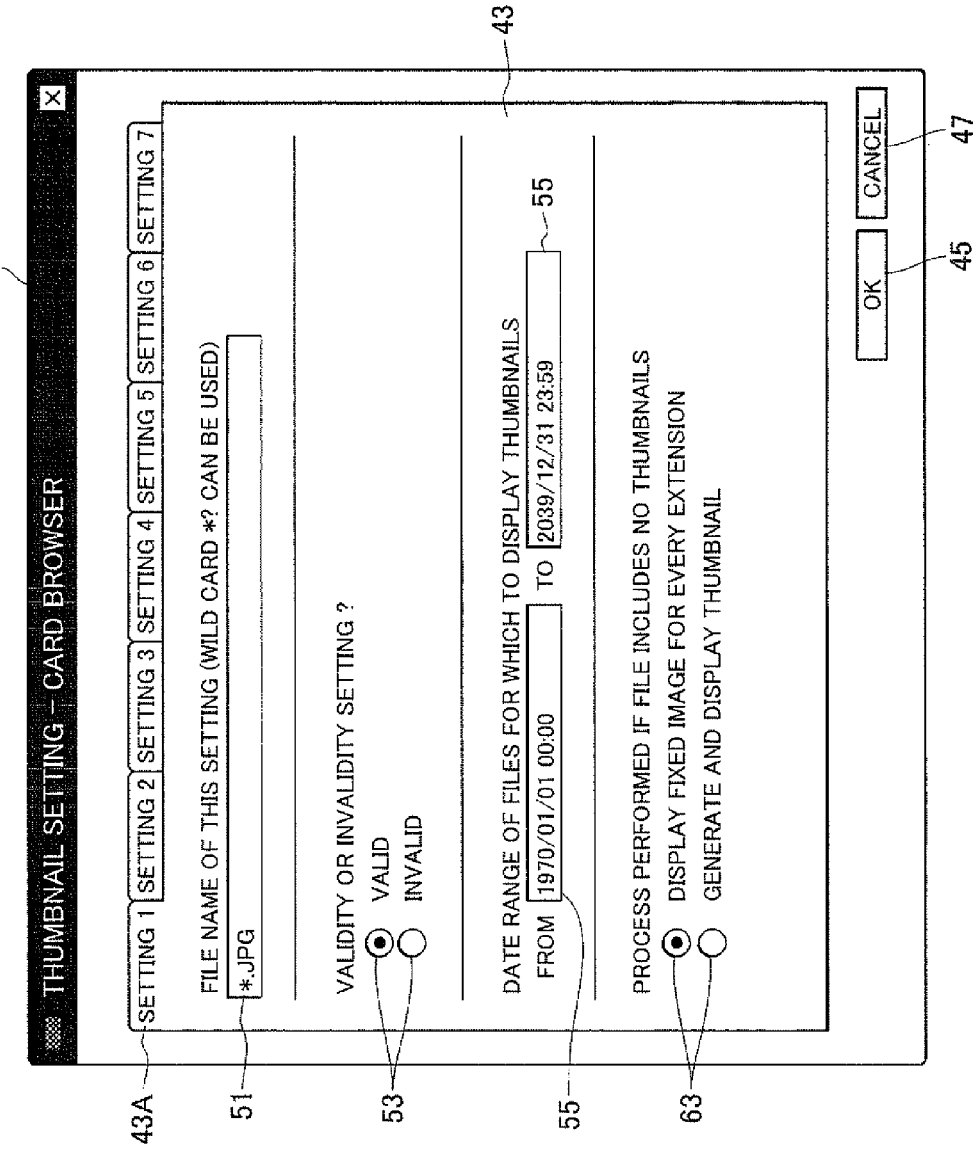
FIG. 11 is a diagram explaining the thumbnail setting screen of the card browser in a second embodiment.

The second embodiment differs from the first embodiment in the function that the card browser performs for setting thumbnails. More specifically, when the user of the client 2 clicks the "thumbnail setting" button 35 arranged in the main menu screen 31, the display unit 23 of the client 2 displays such a thumbnail-setting screen 61 as shown in FIG. 11. Using the thumbnail-setting screen 61, the user can set thumbnails.

In the thumbnail-setting screen 61, a plurality of tab windows 43 are displayed in the same manner as in the first embodiment. Of the items displayed in the tab windows 43, the file-name input column 51, radio buttons 53 and date-condition input column 55 are identical to those displayed in the first embodiment.

Of the items displayed in the tab windows 43, the radio buttons 63 are a little different in specification from the radio buttons 57 used in the first embodiment. More precisely, only two radio buttons 63 are provided in the second embodiment, not three as in the first embodiment, though they are similar to the radio buttons 57 in that one of them is selected.

If the user desires to acquire the extracted thumbnail (B) when the file includes a thumbnail and to acquire the fixed image (A) when the file includes no thumbnails, he or she selects one of the radio buttons 63 which indicates "Display fixed image earmarked for each extension,".

If the user desires to acquire the extracted thumbnail (B) when the file includes a thumbnail or to acquire the generated thumbnail (C) when the file includes no thumbnails, he or she selects one of the radio buttons 63 which indicates "Generate and display thumbnail."

That is, in the second embodiment, the user cannot select "Make server 1 generate and display thumbnail in any case," which can be accomplished in the first embodiment by operating the third radio button 57.

According to such a specification, the thumbnail cannot be generated by the server 1 in any case, however, the user can be prevented from carelessly selecting to "Make server generate and display thumbnail in any case." Hence, no excessive load will be exerted on the server 1. This specification is therefore worthy to employ if the server 1 has but a relatively low processing ability.

[One File Icon Updating Process]

Figure 12:
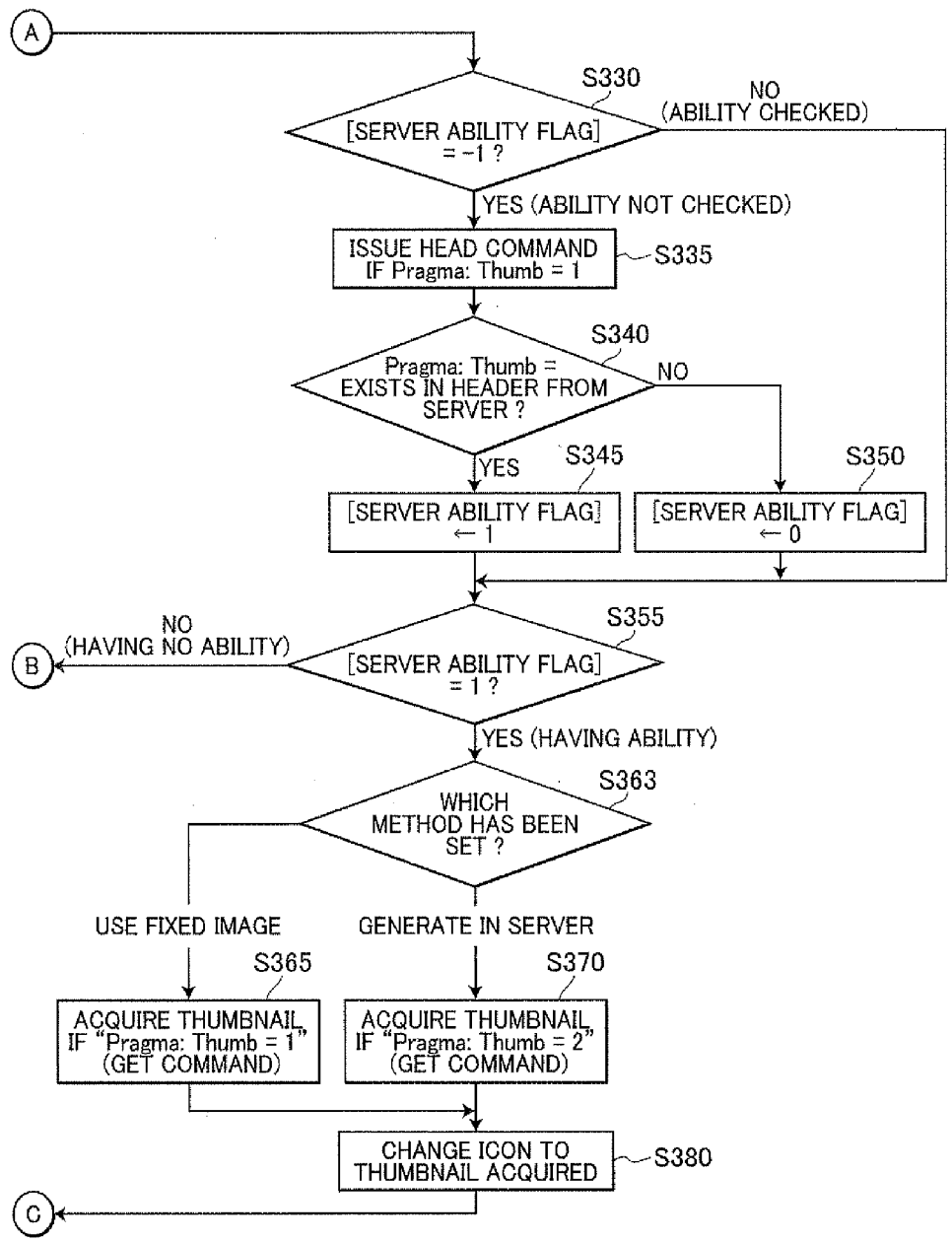
FIG. 12 is a flowchart explaining a process (second part) of updating a one file icon in the second embodiment.

The "one file icon updating process", which is performed when the specification of thumbnail setting function is changed, will be explained with reference to FIG. 12.

The first embodiment performs the "one file icon updating process" shown in FIG. 6 and FIG. 7. By contrast, the second embodiment performs the "one file icon updating process" shown in FIG. 6 and FIG. 12. Thus, the second embodiment is changed from the first embodiment in regard to FIG. 12 only, and is not changed in regard to FIG. 6.

To be specific, the second embodiment differs in that Step S363 is performed in place of Step S360 (FIG. 7) and no step equivalent to Step S375 (FIG. 7) is performed. In any other respects, the second embodiment does not differ from the first embodiment.

More precisely, in the first embodiment, the client 2 acquires a thumbnail in one of three methods, which has been selected by operating one of the three radio buttons 57, and in which method the thumbnail has been acquired is determined in Step S360 (FIG. 7). In the second embodiment, the client 2 acquires a thumbnail in one of two methods, which has been selected by operating one radio button 63 or the other radio button 63. Thus, in Step S363 which of the two methods has been set is determined (see FIG. 12).

Depending on the method which has been set, the operation goes to Step S365 or S370. Thus, no steps equivalent to Step S375 are not performed in the second embodiment.

(2-2) Functions and Processes in Server

Next, the functions and processes the sever 1 performs will be described, mainly the components that differ from their counterparts of the first embodiment.

[HTTP Process Corresponding to Thumbnails]

Changes of "HTTP process corresponding to thumbnails", due to the specification change of thumbnail setting function, will be explained in detail with reference to FIG. 13.

The first embodiment performs the "thumbnail extracting/generating process" shown in FIG. 10. By contrast, the second embodiment performs the "thumbnail extracting/generating process" shown in FIG. 13. The process of FIG. 13 differs from that of FIG. 10 in that Step S607 is performed in place of Step S605. In any other respects, the process is identical to the process of FIG. 10.

In Step S605 (see FIG. 10), whether the character described in the header, following the character train "Pragma: Thumb=", is "1", "2" or "3" is determined. In Step S607, whether the character described in the header, following the character train "Pragma: Thumb=", is "1" or "2" is determined (S607).

That is, since the function of setting thumbnails has been changed in specification, "Pragma: Thumb=3" is not transmitted from the client 2. Therefore, such a determination is omitted. In the first embodiment, the operation goes to Step S630 if "Pragma: Thumb=3". Nonetheless, Step S630 and the subsequent steps are performed similar to the first embodiment, because Step S630 may follow Step S625, too.

(2.3) Advantages of Second Embodiment

The thumbnail distribution system described above can achieve the same advantages as the first embodiment.

Moreover, no excessive load is imposed on the server 1 because thumbnails are not generated in the server 1 at all times. Hence, the system can be appropriately operated even if processing ability thereof is relatively low.

(3) Modifications

Embodiments of the present invention have been described. This invention is not limited to the embodiments, nevertheless. Various changes and modifications can be made in the present invention.

In the embodiments described above, the application that issues HTTP requests is a card browser that displays thumbnails in a specific layout. Nonetheless, the most important point of the invention resides in the issuing of an HTTP request that contains thumbnail-requesting data in a request header thereof. Hence, the method of displaying the thumbnail acquired is not limited to any particular one.

For example, the configuration of this invention may be employed in any application (e.g., Web browser) that has a user interface capable of inputting URL directly. In this case, the URL corresponding to a file stored in the server can be directly input to acquire thumbnails. Any thumbnail thus acquired can be displayed on the card browser as described above. Alternatively, the thumbnail may be held in a file for future use for any other purpose or printed by a printer.

That is, after receiving the HTTP response from the server, the client can perform any data processing, utilizing the thumbnail stored in the response body of the HTTP. That is, the data can be processed in various ways, such as displaying, printing, and storing.

In the embodiments described above, both the server 1 and the client 2 are compliant with WebDAV. Nonetheless, the server 1 and the client 2 may be compliant with WebDAV or may not be compliant with WebDAV, which is optional.

In the embodiments described above, the client 2 issues a HEAD command in Step S335 to determine whether the server 1 can provide thumbnails. This may be replaced by the following configuration.

Only for the first file to be processed, the client 2 performs the processes corresponding to Steps S365 and S370 or the process corresponding to Step S375, exceptionally without determining whether the server 1 has thumbnail providing function. Then, the server 1 transmits an HTTP response to the client 2. From the HTTP response, the client 2 determines whether the server 1 has the thumbnail providing function.

Thus, for the second file and the subsequent files, the client 2 performs Steps S365 and S370 or S375, issuing a GET command to the server 1, only if the server 1 has the thumbnail providing function.

In this method, the client 2 can issue a GET command for only the first file to be processed, even if the server 1 has no thumbnail providing function. However, in this case, the server 1 transmits one file only. Hence, no practical problems will arise.

If the server 1 has no thumbnail providing function, the file body must be transmitted to the client 2. In this case, the file body may be effectively used. For example, GET commands may be issued for all files to be processed, without confirming whether the server 1 has the thumbnail providing function.

In this case, the thumbnails are transmitted to the client 2 if the server 1 has the thumbnail providing function, and the file body is transmitted to the client 2 if the server 1 does not have the function of providing thumbnails.

That is, if the same GET command is issued to the sever 1, the thumbnails or the file body will be transmitted to the client 2 in accordance with the function of the server 1. With this configuration, if the data transmitted to the client 2 is the file body, the client 2 can generate thumbnails from the file body.

Hence, if acquiring thumbnails reliably at the client is regarded more important than controlling the communication traffic on the network, either the thumbnails or the file body can be easily acquired.

In the embodiments described above, thumbnails are extracted and generated in the server 1 and are distributed from the server 1 to the client 2, for the file stored in the memory card 19 set in the card reader unit 14 that is provided in the server 1. The file storage means is not limited to a memory card. Other various types of storage devices may be used to store the file.

The file storage means may be, for example, a storage device that cannot hold a removable medium, like the hard disk drive incorporated in the server 1. Alternatively, the file storage may be a storage device provided outside the server 1, like a network storage device the server 1 can access via a network. Further, in such a network storage device, too, the file may be stored in a removable medium set in a card reader provided in the same LAN as the server 1 is provided. Alternatively, the file may be stored in a hard disk type device provided in the same LAN as the server 1 is provided.

What is claimed is:

1. A thumbnail distribution system comprising:
   a client device comprising:
      a request generating unit configured to generate a hypertext transfer protocol (HTTP) request having a request line storing a file name of a file stored in a storing unit and to generate inquiring data to inquire if the server is provided with a thumbnail providing function;
      a request transmitting unit configured to transmit the HTTP request;
      a response receiving unit configured to receive an HTTP response having a response body storing a thumbnail corresponding to the file having the file name stored in the request line;
      a data processing unit configured to perform a data processing based on the thumbnail stored in the response body; and
      a determining unit; and
   a server communicable with the client device by using the HTTP, the server comprising:
      a request receiving unit configured to receive the HTTP request transmitted from the request transmitting unit;
      a response generating unit configured to generate the HTTP response based on the HTTP request; and
      a response transmitting unit configured to transmit the HTTP response to the response receiving unit,
   wherein the request transmitting unit of the client device is further configured to transmit the inquiring data to the request receiving unit of the server, whereupon the response generating unit of the server is further configured to generate response data based on the inquiring data, the response data indicating whether or not the server is provided with the thumbnail providing function, the response data not including the thumbnail even if the server is provided with the thumbnail providing function, the response transmitting unit of the server is further configured to transmit the response data in response to the inquiring data to the response receiving unit of the client device, and
   wherein the determining unit of the client device is configured to determine, based on the response data, whether or not the server is provided with the thumbnail providing function, and the request transmitting unit of the client device is configured to transmit an HTTP request, requesting for a transmission of a thumbnail, to the request receiving unit of the server when the determining unit of the client device determines that the server is provided with the thumbnail providing function, and the request transmitting unit of the client device is configured not to transmit the HTTP request requesting for the transmission of the thumbnail, when the determining unit of the client device determines that the server is not provided with the thumbnail providing function.

2. The thumbnail distribution system according to claim 1, wherein the client device further comprises a condition input unit into which a condition of files that a user desires to acquire is inputted,
wherein the request generating unit generates an HTTP request having a request line storing a file name of a file satisfying the condition.

3. The thumbnail distribution system according to claim 2, wherein the data processing unit comprises:
a display unit configured to display the thumbnail stored in the response body; and
a position setting unit configured to set a position on the display unit at which the thumbnail is displayed.

4. The thumbnail distribution system according to claim 2, wherein the condition is a character train of a file name.

5. The thumbnail distribution system according to claim 2, wherein the condition is a time and a day on which a file has been generated.

6. The thumbnail distribution system according to claim 2, wherein the condition is a time and a day on which the file has been updated.

7. The thumbnail distribution system according to claim 1, wherein the HTTP response further has a response header storing thumbnail-providing data indicating that the server that provides the client device with a thumbnail has the thumbnail providing function.

8. The thumbnail distribution system according to claim 7, wherein the request line further stores a GET method, wherein the HTTP request further has a request header having a first Pragma header field in which thumbnail-requesting data indicating that the client device requests a thumbnail is stored as a first field value, wherein the response header has a second Pragma header field in which the thumbnail-providing data is stored as a second field value.

9. The thumbnail distribution system according to claim 7, wherein the request line further stores a HEAD method, wherein the HTTP request further has a request header having a first Pragma header field in which thumbnail-requesting data indicating that the client device requests a thumbnail is stored as a first field value, wherein the response header has a second Pragma header field in which the thumbnail-providing data is stored as a second field value.

10. The thumbnail distribution system according to claim 9, wherein the response generating unit generates the HTTP response having a response header storing the thumbnail-providing data without having the response body.

11. The thumbnail distribution system according to claim 1, wherein the response generating unit is configured to generate the HTTP response including a selection for a method of acquiring a thumbnail.

12. The thumbnail distribution system according to claim 1, wherein when the storing unit has not a thumbnail corresponding to a file having a file name stored in the request line, the response generating unit generates the thumbnail and stores the generated thumbnail in the response body.

13. The thumbnail distribution system according to claim 1, wherein when the storing unit does not have a thumbnail corresponding to a file having a file name stored in the request line, the response generating unit either generates the thumbnail and stores the generated thumbnail in the response body, or stores data, in the response body, indicating that the storing unit does not store the thumbnail.

14. The thumbnail distribution system according to claim 1, wherein the server is a web-based distributed authoring and versioning (WebDAV) server, and the client device is a WebDAV client device.

15. A server communicable with a client device by using a hypertext transfer protocol (HTTP), the client device including: a request generating hardware unit generating an HTTP request having a request line storing a file name of a file stored in a storing unit and inquiring data to inquire if the server is provided with a thumbnail providing function; a request transmitting hardware unit transmitting the HTTP request; a response receiving hardware unit receiving an HTTP response having a response body storing a thumbnail corresponding to the file having the file name stored in the request line; and a data processing hardware unit performing a data processing based on the thumbnail stored in the response body, the server comprising:
a request receiving hardware unit configured to receive the HTTP request transmitted from the request transmitting unit of the client device;
a response generating hardware unit configured to generate the HTTP response based on the HTTP request; and
a response transmitting hardware unit configured to transmit the HTTP response to the response receiving hardware unit of the client device,
wherein the request receiving hardware unit is further configured to receive the inquiring data transmitted from the request transmitting hardware unit of the client device, the response generating hardware unit is further configured to generate response data based on the inquiring data, the response data indicating whether or not the server is provided with the thumbnail providing function, the response data not including the thumbnail even if the server is provided with the thumbnail providing function, the response transmitting hardware unit is further configured to transmit the response data, in response to the inquiring data, to the response receiving hardware unit of the client device.

16. The server according to claim 15, wherein the response generating hardware unit is configured to generate the HTTP response including a selection for a method of acquiring a thumbnail.

17. A client device communicable with a server by using a hypertext transfer protocol (HTTP), the server including: a request receiving hardware unit receiving an HTTP request having a request line storing a file name of a file stored in a storing unit; a response generating hardware unit generating an HTTP response having a response body storing a thumbnail corresponding to the file having the file name stored in the request line based on the HTTP request; and a response transmitting hardware unit transmitting the HTTP response, the client device comprising:
a request generating hardware unit configured to generate the HTTP request and to generate inquiring data to inquire if the server is provided with a thumbnail providing function;
a request transmitting hardware unit configured to transmit the HTTP request to the request receiving unit of the server;

a response receiving hardware unit configured to receive the HTTP response transmitted from the response transmitting unit of the server;

a data processing hardware unit configured to perform a data processing based on the thumbnail stored in the response body; and a determining hardware unit, wherein the request transmitting unit hardware unit is further configured to transmit the inquiring data to the request receiving unit of the server, whereupon the response receiving hardware unit is further configured to receive response data generated by the response generating hardware unit of the server and transmitted from the response transmitting hardware unit of the server in response to the inquiring data, the response data indicating whether or not the server is provided with the thumbnail providing function, the response data not including the thumbnail even if the server is provided with the thumbnail providing function, and wherein the determining hardware unit is configured to determine, based on the response data, whether or not the server is provided with the thumbnail providing function, and the request transmitting hardware unit is configured to transmit an HTTP request, requesting for a transmission of a thumbnail, to the request receiving unit of the server when the determining hardware unit determines that the server is provided with the thumbnail providing function, and the request transmitting hardware unit is configured not to transmit the HTTP request requesting for the transmission of the thumbnail, when the determining hardware unit determines that the server is not provided with the thumbnail providing function.

18. The client device according to claim 17, wherein the response receiving hardware unit is configured to receive the HTTP response including a selection for a method of acquiring a thumbnail.

19. A non-transitory computer-readable storage medium storing a set of program instructions executable on a server, the server communicable with a client device by using a hypertext transfer protocol (HTTP), the client device including: a request generating unit generating an HTTP request having a request line storing a file name of a file stored in a storing unit and generating inquiring data to inquire if the server is provided with a thumbnail providing function; a request transmitting unit transmitting the HTTP request; a response receiving unit receiving an HTTP response having a response body storing a thumbnail corresponding to the file having the file name stored in the request line; and a data processing unit performing a data processing based on the thumbnail stored in the response body, the set of program instructions comprising:

receiving the inquiring data transmitted from the request transmitting unit of the client device;

generating response data based on the inquiring data, the response data indicating whether or not the server is provided with the thumbnail providing function, the response data not including the thumbnail even if the server is provided with the thumbnail providing function;

transmitting the response data in response to the inquiring data to the response receiving unit of the client device;

receiving the HTTP request transmitted from the request transmitting unit of the client device when the server is provided with the thumbnail providing function;

generating the HTTP response based on the HTTP request; and transmitting the HTTP response to the response receiving unit of the client device.

20. The non-transitory computer-readable storage medium according to claim 19, wherein the HTTP response includes a selection for a method of acquiring a thumbnail.

21. A non-transitory computer-readable storage medium storing a set of program instructions executable on a client device, the client device communicable with a server by using a hypertext transfer protocol (HTTP), the server including: a request receiving unit receiving an HTTP request having a request line storing a file name of a file stored in a storing unit; a response generating unit generating an HTTP response having a response body storing a thumbnail corresponding to the file having the file name stored in the request line based on the HTTP request; and a response transmitting unit transmitting the HTTP response, the set of program instructions comprising:

generating inquiring data to inquire if the server is provided with a thumbnail providing function;

transmitting the inquiring data to the request receiving unit of the server;

receiving response data generated by the response generating unit of the server and transmitted from the response transmitting unit of the server in response to the inquiring data, the response data indicating whether or not the server is provided with the thumbnail providing function, the response data not including the thumbnail even if the server is provided with the thumbnail providing function, determining, based on the response data, whether or not the server is provided with the thumbnail providing function;

generating an HTTP request requesting for a transmission of a thumbnail;

transmitting the HTTP request requesting for the transmission of the thumbnail to the request receiving unit of the server if the determining determines that the server is provided with the thumbnail providing function;

receiving the HTTP response transmitted from the response transmitting unit; and performing a data processing based on the thumbnail stored in the response body, wherein if the determining determines that the server is not provided with the thumbnail providing function, the transmitting does not transmit the HTTP request, requesting for the transmisison of the thumbnail.

22. The non-transitory computer-readable storage medium according to claim 21, wherein the received HTTP response includes a selection for a method of acquiring a thumbnail.

* * * * *